(12) United States Patent
Walecki

(10) Patent No.: US 10,563,975 B1
(45) Date of Patent: Feb. 18, 2020

(54) DUAL-SENSOR ARRANGMENT FOR INSPECTING SLAB OF MATERIAL

(71) Applicant: APPLEJACK 199 L.P., San Jose, CA (US)

(72) Inventor: Wojciech J Walecki, Sunrise, FL (US)

(73) Assignee: APPLEJACK 199 L.P., Milpitas, CA (US)

( * ) Notice: Subject to any disclaimer, the term of this patent is extended or adjusted under 35 U.S.C. 154(b) by 0 days.

(21) Appl. No.: 16/045,434

(22) Filed: Jul. 25, 2018

(51) Int. Cl.
*G01B 9/02* (2006.01)
*G01B 11/06* (2006.01)

(52) U.S. Cl.
CPC ...... *G01B 11/0675* (2013.01); *G01B 9/02091* (2013.01); *G01B 2290/70* (2013.01)

(58) Field of Classification Search
CPC .............. G01B 9/0209; G01B 9/02091; G01B 9/02027; G01B 2290/90; G01B 2290/45
See application file for complete search history.

(56) References Cited

U.S. PATENT DOCUMENTS

| | | | | |
|---|---|---|---|---|
| 2004/0184038 A1* | 9/2004 | Freischlad | ............ | G01B 11/06 356/512 |
| 2006/0139656 A1* | 6/2006 | Kulawiec | ............... | G01B 11/06 356/512 |
| 2007/0229842 A1* | 10/2007 | Jansen | ................... | G01B 11/06 356/492 |
| 2010/0208272 A1* | 8/2010 | Tang | .................. | G01B 9/02021 356/503 |
| 2011/0279822 A1* | 11/2011 | Kannaka | ................ | G01B 11/06 356/503 |
| 2014/0293291 A1* | 10/2014 | Tang | .................. | G01B 11/2441 356/511 |

* cited by examiner

*Primary Examiner* — Jonathan M Hansen
(74) *Attorney, Agent, or Firm* — Maschoff Brennan

(57) ABSTRACT

According to an aspect of one or more embodiments, the present subject matter describes an apparatus for inspecting a slab of a material. The apparatus comprises a first and second low-coherence sensor configured to irradiate a first and second side of a slab of material with first light having a first polarization and second light having a second polarization, and thereafter configured to detect a reflection. A first polarizer is configured to allow reflected first light having the first polarization to pass through, and reject a second-light cross-talk portion having the second polarization. A second polarizer is configured to allow reflected second light having the second polarization to pass through, and reject a first-light cross-talk portion having the first polarization. Further, a computing-system is configured to receive signals representing the reflected first light and the reflected second light; and analyze the reflected first light and the reflected second light.

20 Claims, 14 Drawing Sheets

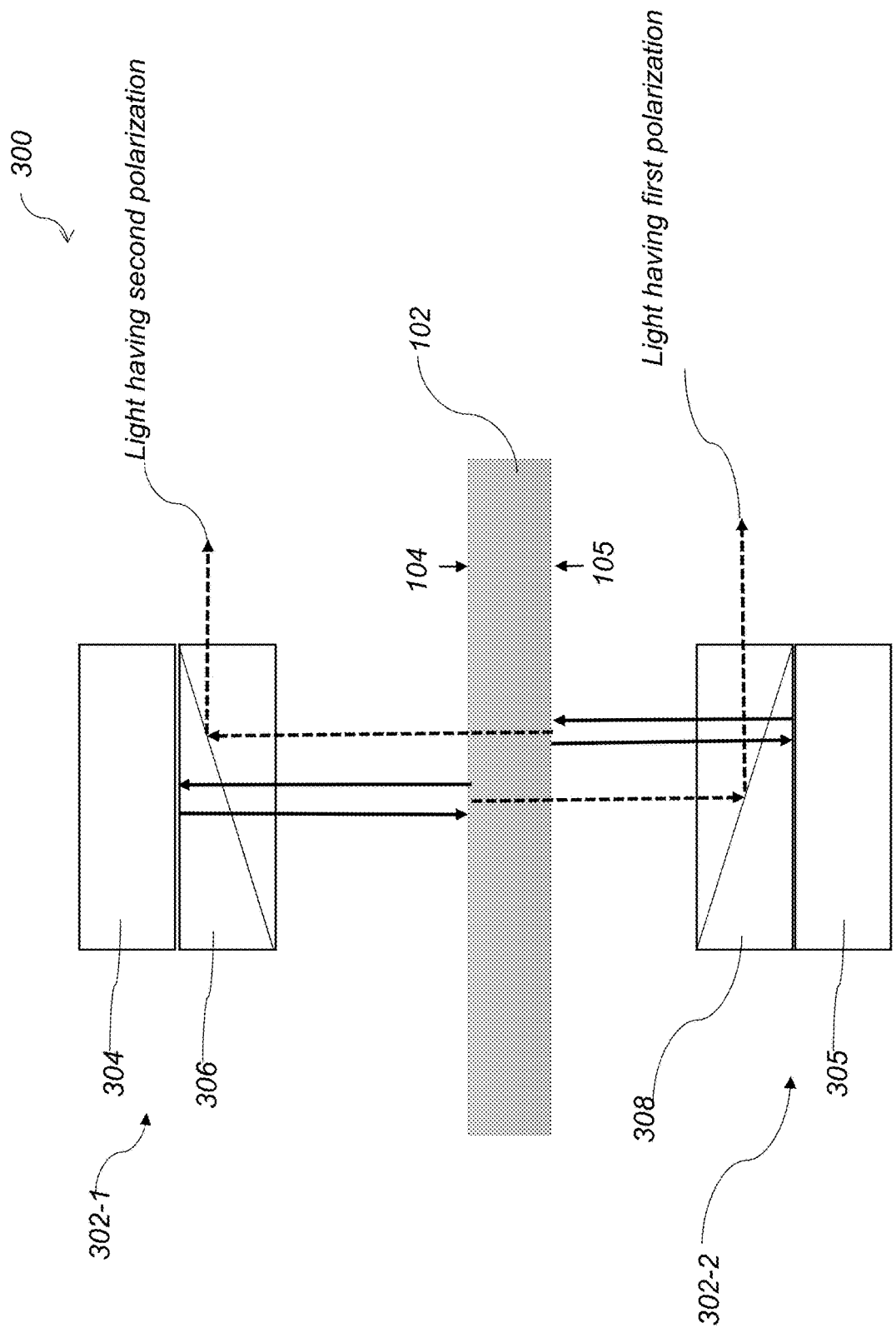

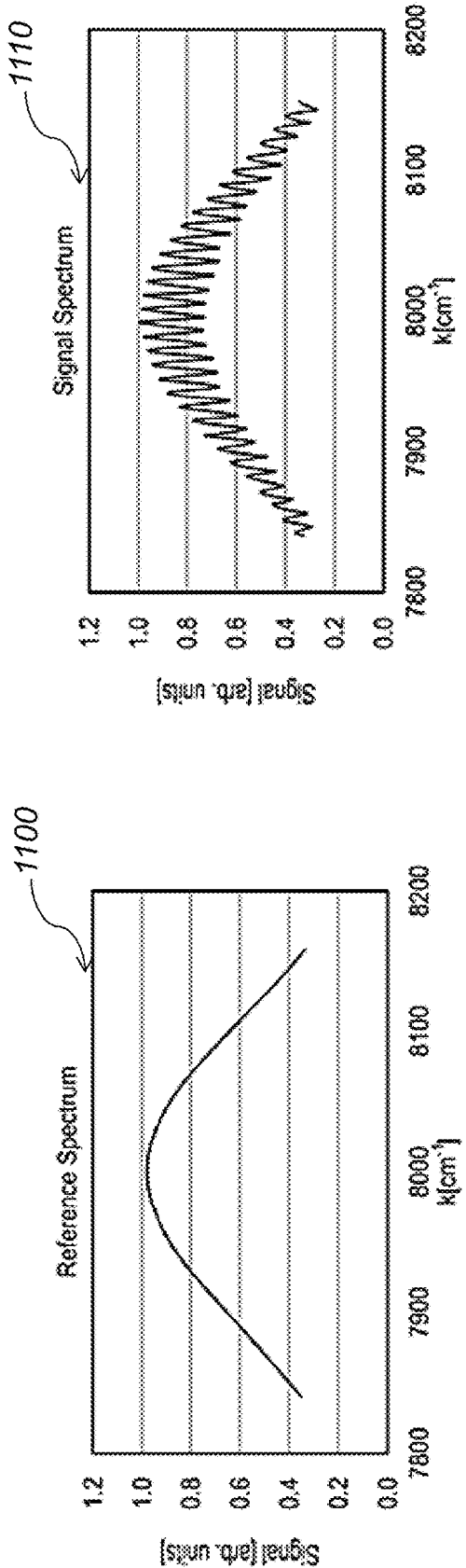
FIG. 11A
FIG. 11B
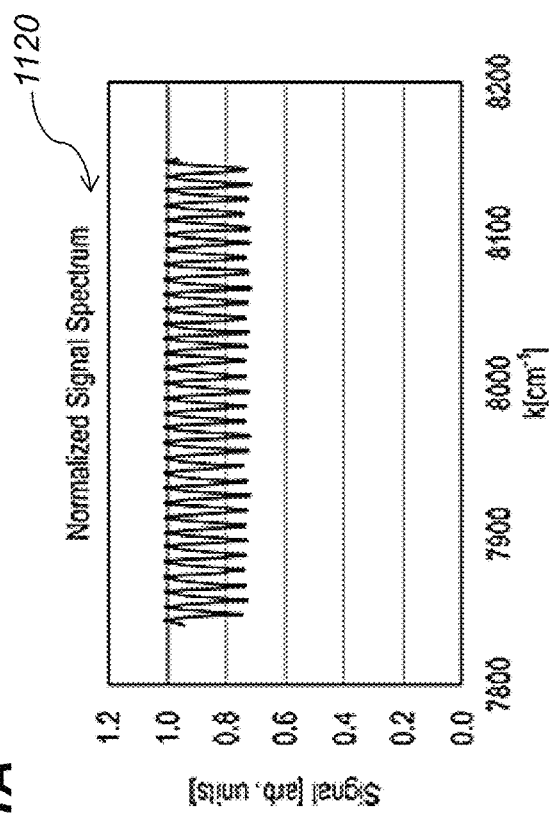
FIG. 11C

DUAL-SENSOR ARRANGMENT FOR INSPECTING SLAB OF MATERIAL

TECHNICAL FIELD

The embodiments discussed in this disclosure are related to systems and methods for inspecting a slab of material and characterization of the slab based thereupon.

BACKGROUND

One of the known mechanisms for measurement of thickness of slab of material involve usage of low-coherence interferometry based probes or sensors that act as distance measurement-gauge. More specifically, the sensors may be used to obtain a distance between sensor and the slab of material and based thereupon cause determination of thickness. In addition, the sensors are also usable for determining refractive-indices of the materials, and evaluate roughness of the interfaces between different material layers and alike.

FIG. 1 depicts a conventional-arrangement for inspecting the slab of material in the form of a dual-sensor arrangement, wherein the sensors 101-1, 101-2 are positioned one above and one below a slab of material 102. The slab 102 is residing on wafer chuck 103 mounted to mounting rod. Both sensors 101-1, 101-2 are positioned at a fixed-distance 'D' there-between. While the distance 'D' remains constant during measurement, the light emanating from bottom sensor 101-1 is in optical communication with the slab 102 through a passage in the chuck 103. Upon measuring a distance 'd1 between the sensor 101-1 and a top of the slab of material and a distance 'd2" between the bottom of the slab of material 102 and the sensor 101-2, the thickness of the sample t_sample is given by:

$$t\_sample = D - d1 - d2 \quad \text{(Equation 1)}$$

The distance 'D' may in turn be realized as a constant-distance (as a part of factory-settings) by placing a calibration standard of known thickness 't_calib' in the tool of FIG. 1 and finding the value D from Equation 2 which is equivalent to Equation 1:

$$D = t\_(\text{calib standard}) + d1 + d2 \quad \text{(Equation 2)}$$

Such dual-sensor arrangement advantageously eliminates influence of thermal-drift of a length of the optical path from the sensor till the surface of the slab of material, since t_sample is extracted as a difference in Equation 1 and thereby rendered independent of the thermal drift subjected to either side of the slab of material.

The subject matter claimed in this disclosure is not limited to embodiments that solve any disadvantages or that operate only in environments such as those described above. Rather, this background is only provided to illustrate one example technology area where some embodiments described in this disclosure may be practiced.

SUMMARY

This summary is provided to introduce a selection of concepts in a simplified format that are further described in the detailed description of the present disclosure. This summary is neither intended to identify key or essential inventive concepts of the disclosure, nor is it intended for determining the scope of the invention or disclosure.

In an embodiment, the present subject matter illustrates an apparatus for inspecting a slab of a material. The apparatus comprises a computing-system configured to analyze light received at a first detector and a second detector. A first low-coherence sensor is configured to receive a first light beam from a first broadband light source, split the first light beam into a first first-beam portion and a second first-beam portion, irradiate a first-side of the slab of material with the first first-beam portion, irradiate a first reflector with the second first-beam portion, receive a first first-beam reflection of the first first-beam portion that reflects off the first side of the slab of material, receive a second first-beam reflection of the second first-beam portion that reflects off the first reflector, combine the first first-beam reflection and the second first-beam reflection into a first combined beam, and direct the first combined beam to the first detector to trigger an analysis of the first combined beam by the computing system. A second low-coherence sensor is configured to irradiate with second light a second side of the slab of material that is opposite the first side and detect a reflection therefrom at a second detector to trigger an analysis by the computing system.

In another embodiment, the present subject matter describes an apparatus for inspecting a slab of a material. The apparatus comprises a first low-coherence sensor configured to irradiate a first side of a slab of material with first light having a first polarization and configured to detect a reflection therefrom, a second low coherence sensor configured to irradiate a second side of the slab of material that is opposite the first side with second light having a second polarization and configured to detect a reflection therefrom. A first polarizer is configured to allow light having the first polarization to pass through it, reject light having the second polarization, receive the reflected first light that reflects off the first side of the slab of material, allow the reflected first light to pass through based on the reflected first light having the first polarization, receive a second-light cross-talk portion of the second light that passes through the slab of material from the second side to the first side; and filter out the second-light cross-talk portion based on the second-beam cross-talk portion having the second polarization. A second polarizer is configured to allow light having the second polarization to pass through it, reject light having the first polarization, receive the reflected second light that reflects off the second side of the slab of material, allow the reflected second light to pass through based on the reflected second light having the second polarization, receive a first-light cross-talk portion of the first light that passes through the slab of material from the first side to the second side; and filter out the first-light cross-talk portion based on the first-light cross-talk portion having the first polarization. Further, a computing-system is configured to receive the reflected first light from the first polarizer, receive the reflected second light from the second polarizer; and analyze the reflected first light and the reflected second light.

The objects and advantages of the embodiments will be realized and achieved at least by the elements, features, and combinations particularly pointed out in the claims. It is to be understood that both the foregoing general description and the following detailed description are examples and explanatory and are not restrictive of the invention, as claimed.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 illustrates a schematic-view of the dual-sensor arrangement of FIG. 3 together with a diagrammatic representation of handling of cross-talk, in accordance with an embodiment of the present disclosure;

FIG. 11A illustrates a simulated spectrum that may be measured by a spectrometer within any of the example systems of FIGS. 6-9;

FIG. 11B illustrates a simulated spectrum that is reflected from the slab of material and obtained using any of the example systems of FIGS. 6-9;

FIG. 11C illustrates a simulated normalized spectrum that may result from dividing the simulated spectrum of FIG. 11B using the simulated spectrum of FIG. 11A.

Figure 1:
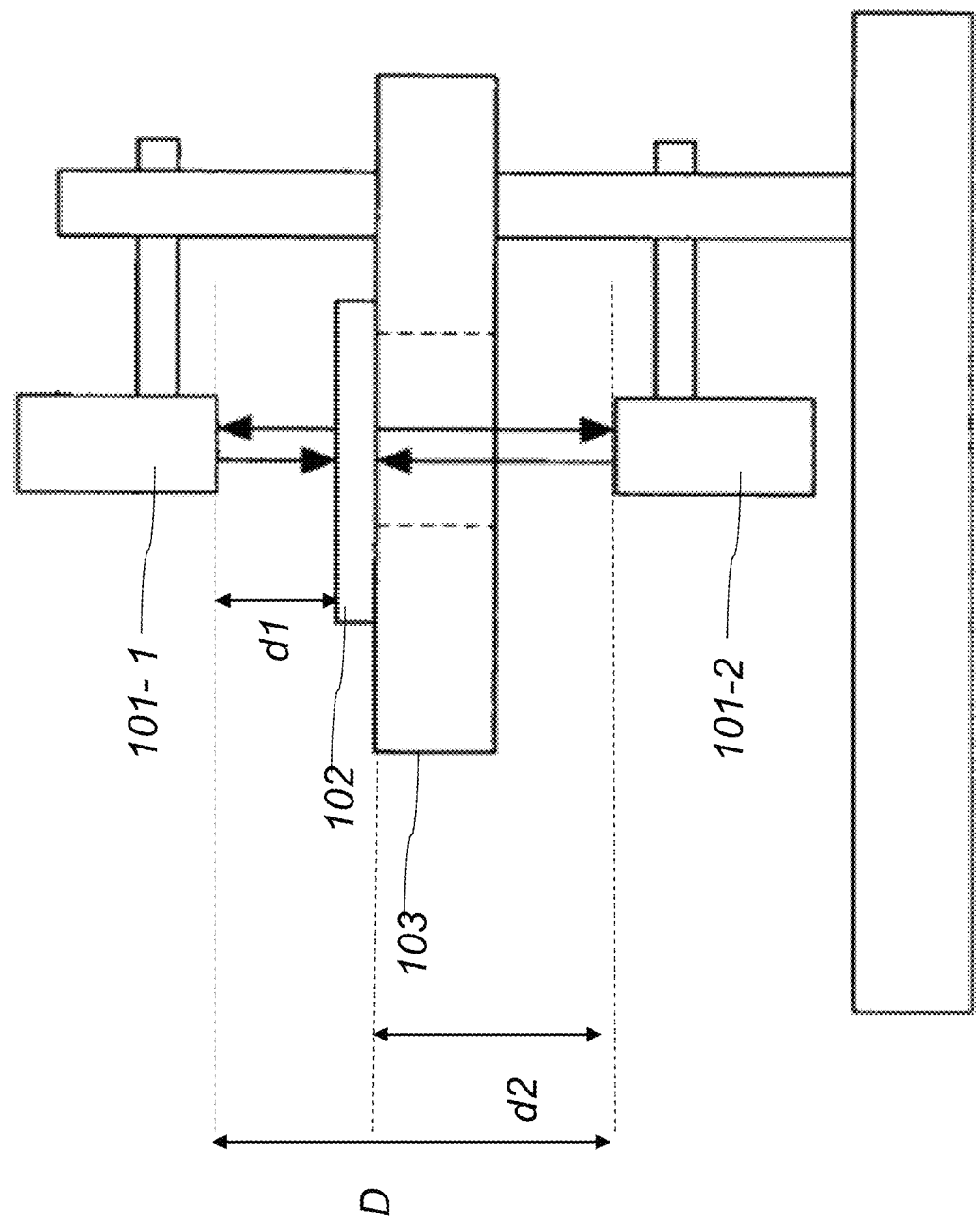
FIG. 1 illustrates a schematic-view of the state of the art dual-sensor arrangement for characterization of a slab of material.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF SOME EXAMPLE EMBODIMENTS

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Figure 2:
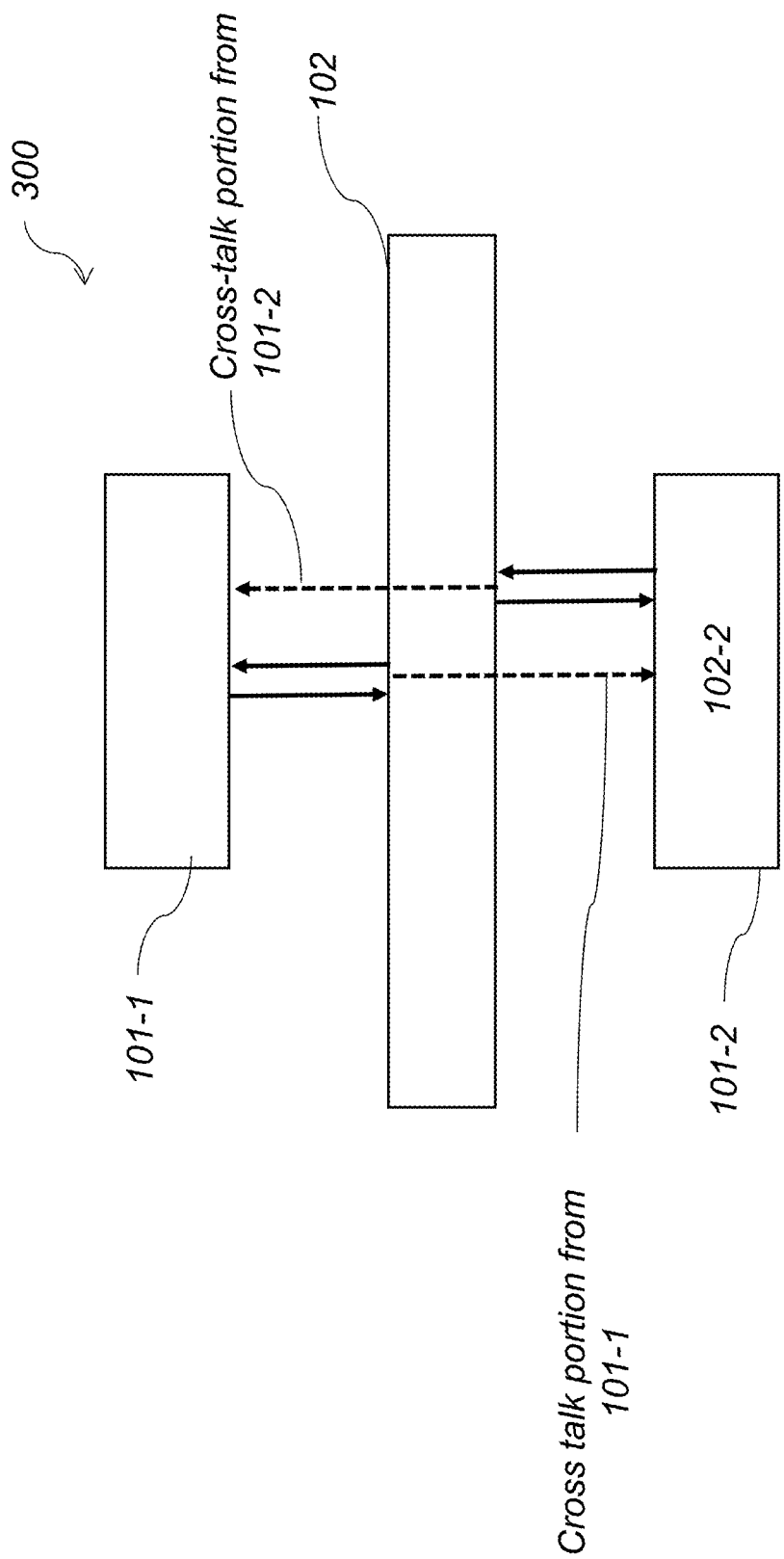
FIG. 2 illustrates another schematic-view depicting the dual sensor arrangement of FIG. 1 and a diagrammatic representation of cross-talk as prevalent therein.

FIG. 2 illustrates another schematic-view depicting the state of the art dual sensor arrangement of FIG. 1 and a diagrammatic representation of cross-talk problem therein. As depicted within present figure, the application of dual-sensor arrangement for characterization of the slab of material that is 'highly transparent' gets hampered OR adversely affected owing to the fact that portion of radiation emanating from the sensor 101-1 may be detected by the sensor 101-2 and vice-versa. This results in crosstalk between the sensors 101-1, 2 and a situation wherein the two sensors start interacting with one-another, thereby leading to inaccurately performed characterization of the slab of material 102.

Accordingly, there lies a need for an improved dual-sensor arrangement for a precise characterization of slab of material 102.

More specifically, there lies a need of removal of cross-talk in case the dual-sensor arrangement is employed for characterization of a transparent or a semi-transparent slab of material 102 from opposite sides.

Embodiments of the present disclosure will be explained with reference to the accompanying drawings.

Figure 3:
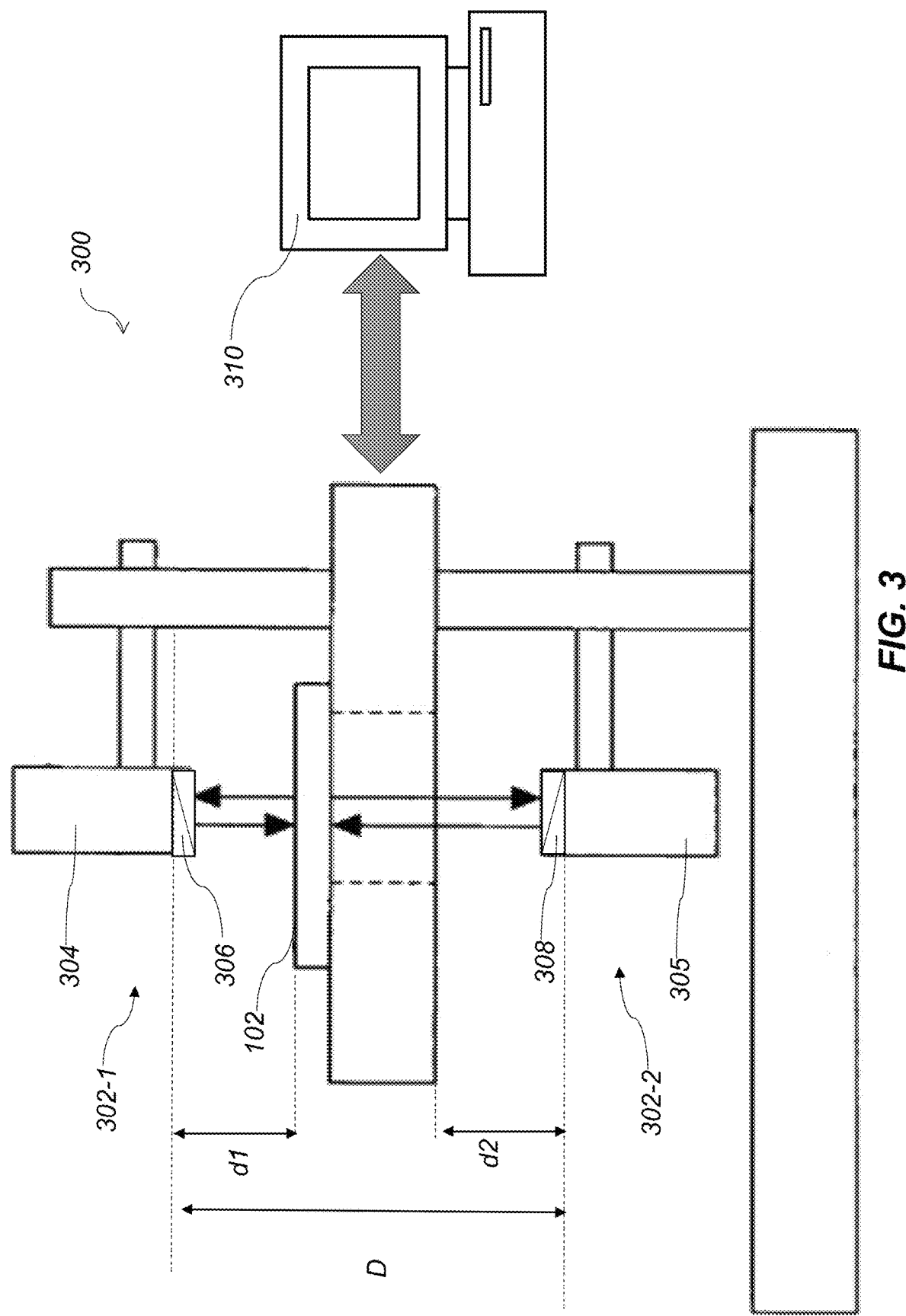
FIG. 3 illustrates a schematic-view of a dual-sensor arrangement for characterization of a slab of material, in accordance with an embodiment of the present disclosure.

FIG. 3 illustrates a schematic-view a dual sensor arrangement for characterization of slab of material, in accordance with an embodiment of the present disclosure. More specifically, the present figure illustrates an apparatus 300 for inspecting a slab 102 of a material. According to at least one embodiment described in this disclosure, the apparatus 300 for inspecting a slab of material 102 may be configured to determine a topography of one or more surfaces of the slab of material 102 and/or determine a thickness of the slab of material 102. The material of the slab of material 102 may be, for example, a semiconductor device such as any circuit, chip, or device that is fabricated on a silicon substrate wafer, a MEMS structure, or an interconnect feature used in 3D packaging.

In an example, the apparatus 300 may include single mode optical fiber, a broadband light source, a beam assembly, a computer-controlled etalon filter, and a computer-controlled spectrometer. The apparatus 300 may be employed to determine the thickness of a slab of material using only a single etalon, even when the thickness of the slab of material is greater than about 50 µm.

In some embodiments, the apparatus 300 may include a first low-coherence sensor 302-1. The first low-coherence sensor 302-1 may be configured to irradiate a first side of a slab of material 102 with first light having a 'first-polarization' (e.g. s polarization or p polarization) and configured to detect a reflection therefrom. The first low-coherence sensor 302-1 may include a first sensor segment 304 and a first polarizer 306. The first sensor segment 304 may be configured to generate radiation which may irradiate the slab of material 102. The first sensor segment 304 may also include a sensing element configured to measure radiation received.

In some embodiments, the first sensor segment 304 may be configured to generate the first light having the first polarization. Additionally or alternatively, the first polarizer 306 may polarize light generated by the first sensor segment 304 to have the first polarization. The first polarizer 306 may be configured to allow light having the first polarization to pass-through the first polarizer 306. Further, the first polarizer may be configured to reject (e.g., reflect) light having a second polarization (which may be orthogonal to the first polarization). Reflected first light that reflects off the first side of the slab of material 102 that has the first polarization is also allowed to pass through polarizer 306 back towards the first sensor segment 304 based on the reflected first light having the first-polarization.

In some embodiments, the apparatus 300 may also include a second low coherence sensor 302-2, which may be configured to irradiate a second side of the slab of material 102 (through a hole within the chuck) that is opposite the first side with second light having a second polarization and configured to detect a reflection therefrom. The second polarization may be orthogonal to the first polarization. The second low-coherence sensor 302-2 may be include a second sensor segment 305 and a second polarizer 308. The second sensor segment 305 may be configured to generate radiation which may irradiate the slab of material 102. The second sensor segment 305 may also include a sensing element configured to measure radiation received.

In some embodiments, the second sensor segment 305 may be configured to generate the second light having the second polarization. Additionally or alternatively, the second polarizer 308 may polarize light generated by the second sensor segment 305 to have the second polarization. The second polarizer 308 may be configured to allow light having the second-polarization to pass through and reach the second side of the slab of material 102. The second-polarizer 308 also receives reflected second light (having the second-polarization) that reflects off the second side of the slab of material 102 and allows the reflected second light to pass through and reach the second sensing element 305.

Also, the second polarizer 308 may be configured to reject light having the first polarization. For example, the second polarizer 308 may receive a first-light cross-talk portion of the first light (represented by dotted lines in FIG. 4) that passes through the slab of material 102 from the first side to the second side. The second polarizer 308 may filter out the first-light cross-talk portion based on the first-light cross-talk portion having the first polarization. Likewise, a second-light cross-talk portion of the second-light that passes through the hole in the chuck and thereafter the slab of material 102 may be filtered out by the first polarizer 306 based on the second-beam cross-talk portion having the second polarization.

Each of the first low-coherence sensor 302-1 and the second sensor 302-2 and the corresponding-operation have been elaborated with respect to description in FIG. 6 to FIG. 12. Further, a movable-stage is provided to support the slab of material 102 at a pre-determined level between the first sensor 302-1 and the second sensor 302-2.

Further, a computing-system 310 is connected to both of the first low-coherence sensor 302-1 and the second low-coherence sensor 302-2 and may be an assembly of an array detector (e.g. charge coupled device) and electronics (analog to digital converter and data processing modules). The computing-system 310 may be configured to receive a signal representing the reflected first light that passes through the first polarizer 306 and is received by the first sensor segment 304. The computing system 310 may also be configured to receive a signal representing the reflected second light that passes through the second polarizer 308 and is received by the second sensor segment 305. Thereafter, the reflected first-light and the reflected second-light may be analyzed by the computing system 310 for characterization of the slab of material 102 as depicted with respect to the description of FIGS. 6 to 13

FIG. 4 illustrates a schematic-view of the dual-sensor arrangement of FIG. 3 together with a diagrammatic representation of rejection of the cross-talk, in accordance with an embodiment of the present disclosure.

The first polarizer 306 may be configured to allow the first light having a first polarization emanating from the first sensor segment 304 to pass through the first polarizer 306 to reach a first side 104 of the slab of material 302. Thereafter, the reflected first light from the first side 104 of the slab of material 102, having the first polarization, passes through the first polarizer 306 and is captured by the first sensor segment 304. Additionally, any light having the second polarization that is incident upon the first polarizer 306 is reflected and prevented from reaching the first sensor segment 304. For example, a second-light cross-talk portion (illustrated as a dotted line) resulting from an interaction between a second light and the slab of material 102 and having the second-polarization is reflected or filtered at the first polarizer 306. As may be understood the second-light cross-talk portion may originate from a second low-coherence sensor 302-2 which may be positioned on the opposite side (for example, a second side 105) of the slab of material 102 from the first low-coherence sensor 302-1. The second-light cross-talk portion may reach the first low-coherence sensor 302-1 through the slab of material 102.

Additionally or alternatively, the second polarizer 308 may be configured to allow the second light having the second polarization emanating from the second sensor segment 305 to pass through the second polarizer 308 to reach the second side 105 of the slab of material 102. Thereafter, the reflected second light from the second side 105 of the slab of material 102, having the second polarization, may pass through the second polarizer 308 and be received by the second sensor segment 305. Additionally, any light having the first polarization that is incident upon the second polarizer 308 may be reflected and prevented from reaching the second sensor segment 305. For example, a first light cross-talk portion (illustrated as a dotted line) resulting from the interaction between the first light and the slab of material 102, having the first-polarization, is reflected or filtered at the second polarizer 308. As may be understood, such first-light cross talk portion may originate from the first low-coherence sensor 302-1 and may reach the second low-coherence sensor 302-2 through the slab of material 102.

Figure 5A:
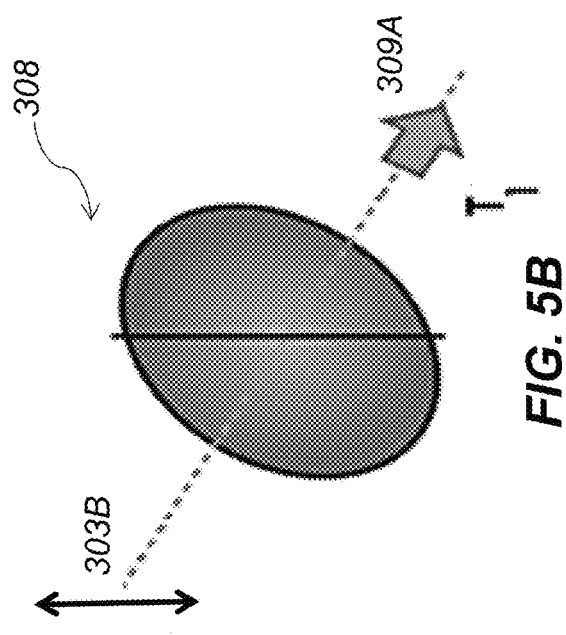
FIG. 5A illustrates an operation of a polarizer which may be included in the dual-sensor arrangement of FIG. 3, in accordance with an embodiment of the present disclosure.

FIG. 5A illustrates an operation of a first polarizer 306 which may be included in the dual-sensor arrangement of FIG. 3, in accordance with an embodiment of the present disclosure. Specifically, FIG. 5A illustrates the first polarizer 306, having a first polarization, allowing light 303A, having the first polarization, to pass through the first polarizer 306. The large arrow 307A may indicate a magnitude of a first transmittance corresponding to the first polarizer 306 allowing light 303A having the first polarization to pass through the first polarizer 306.

Figure 5B:
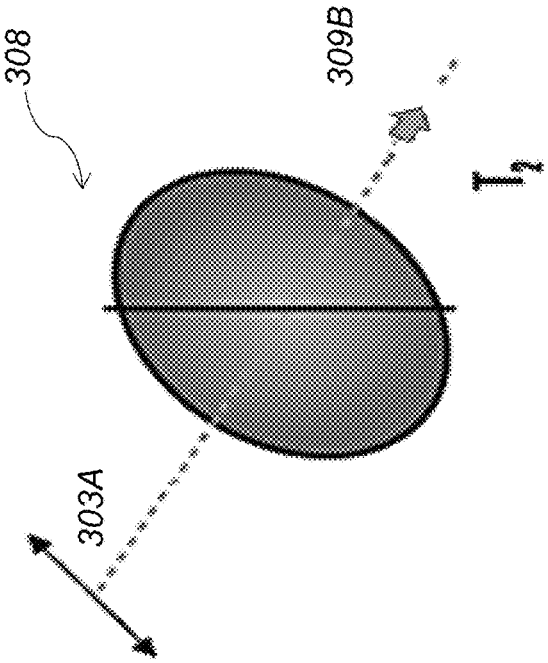
FIG. 5B illustrates an operation of a polarizer which may be included in the dual-sensor arrangement of FIG. 3, in accordance with an embodiment of the present disclosure.

FIG. 5B illustrates an operation of a second polarizer 308 which may be included in the dual-sensor arrangement of FIG. 3, in accordance with an embodiment of the present disclosure. Specifically, FIG. 5B illustrates the second polarizer 308, having a second polarization, allowing light 303B, having the second polarization, to pass through the second polarizer 308. The large arrow 309A may indicate a magnitude of a second transmittance corresponding to the second polarizer 308 allowing light 303B having the second polarization to pass through the second polarizer 308.

Figure 5C:
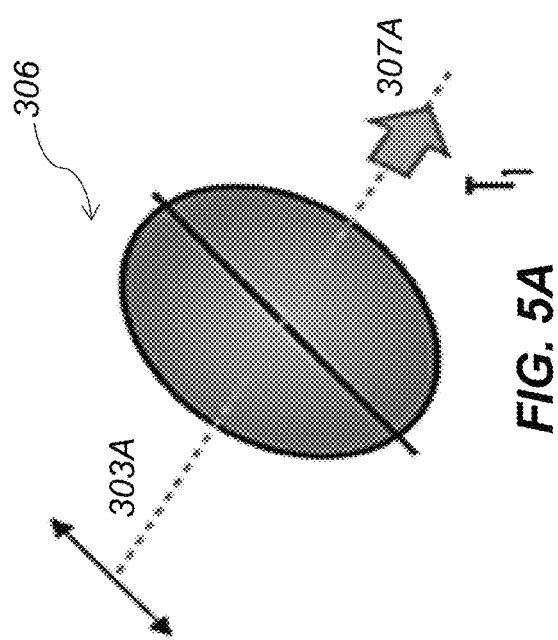
FIG. 5C illustrates an operation of a polarizer which may be included in the dual-sensor arrangement of FIG. 3, in accordance with an embodiment of the present disclosure.

FIG. 5C illustrates an operation of a first polarizer 306 which may be included in the dual-sensor arrangement of FIG. 3, in accordance with an embodiment of the present disclosure. Specifically, FIG. 5C illustrates the first polarizer 306, having a first polarization, rejecting light 303B having the second polarization. The small arrow 307B may indicate a magnitude of a third transmittance corresponding to the first polarizer 306 rejecting light 303B having the second polarization.

Figure 5D:
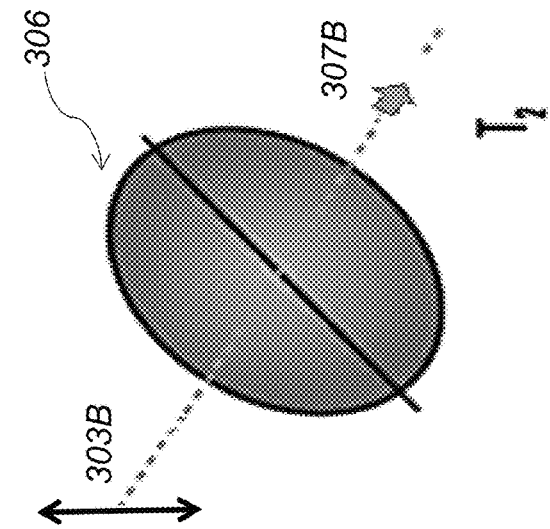
FIG. 5D illustrates an operation of a polarizer which may be included in the dual-sensor arrangement of FIG. 3, in accordance with an embodiment of the present disclosure.

FIG. 5D illustrates an operation of a second polarizer 308 which may be included in the dual-sensor arrangement of FIG. 3, in accordance with an embodiment of the present disclosure. Specifically, FIG. 5D illustrates the second polarizer 308, having a second polarization, rejecting light 303A having the first polarization. The small arrow 309B may indicate a magnitude of a fourth transmittance corresponding to the second polarizer 308 rejecting light 303A having the first polarization.

As may be understood, each of the first polarizer 306 and the second polarizers 308 are optical filters that let specific orientation of light (i.e. polarization) pass through while blocking other types of polarized-light. The efficiency with which the polarizer can block perpendicular polarizations to the axis of polarization is called polarization-efficiency P. The extinction ratio $[(1+P)/(1-P)]:1$ is the ratio of the transmittance of light for light parallel to polarization axis over the transmittance of light with perpendicular polarization to the axis of polarization. In an example, the extinction ratio with respect to the polarizers 306 and 308 may be in range of 100:1 to $10^6$:1.

Transmittance is the ratio of transmitted intensity of light over incident intensity of light. Large arrow 307A represents the transmittance of light 303A through the polarizer 306, where the light 303A has a polarization parallel to the axis of polarization or transmission axis of the polarizer 306. Large arrow 309A represents the transmittance of light 303B through the polarizer 308, where the light 303B has a polarization parallel to the axis of polarization or transmission axis of the polarizer 308. Small arrow 307B represents the transmittance of light 303B through the polarizer 306, where the light 303B has a polarization orthogonal to the axis of polarization or transmission axis of the polarizer 306. Small arrow 309B represents the transmittance of light 303A through the polarizer 308, where the light 303A has a polarization orthogonal to the axis of polarization or transmission axis of the polarizer 308. As may be seen from FIG. 5A and FIG. 5B, transmittance T1 (which corresponds to the large arrows 307A and 309A) with respect to the polarizers 306 and 308 has been depicted. In an example, FIG. 5A and FIG. 5B represent the first 306 and second polarizer 308, respectively, such that both of the polarizers 306, 308 are orthogonal with respect to each other. Further, FIG. 5C and FIG. 5D, depict the transmittance T2 (which corresponds to small arrows 307B and 309B) with respect to the polarizers 306, 308. As may be understood, Malus's Law dictates the transmitted intensity at which light that is polarized at an angle difference of $\theta_i$ with the axis of polarization of the polarizer.

$$I_T = I_0 \cos^2(\theta_i)$$

Now, since $\theta_i=0$ with respect to FIG. 5A and $\theta_i=90$ with respect to FIG. 5B, T1 has a substantially high value, while T2 is negligibly small. In an example, the first and second light may be plane-polarized in orthogonal-directions with respect to each other. In an example, first light may be s-polarized and second light may be p-polarized. Accordingly, the polarizers 306 and 308 may respectively be s-polarization filter and p-polarization filter, and correspond to linear-polarizers. In other example, the polarizers 306 and 308 may be a combination of linear polarizers and polarization rotators (e.g. half-wave or quarter-wave plates) capable of producing circular-polarizations in opposite hands, i.e right-hand polarization and left-hand polarization.

Figure 6:
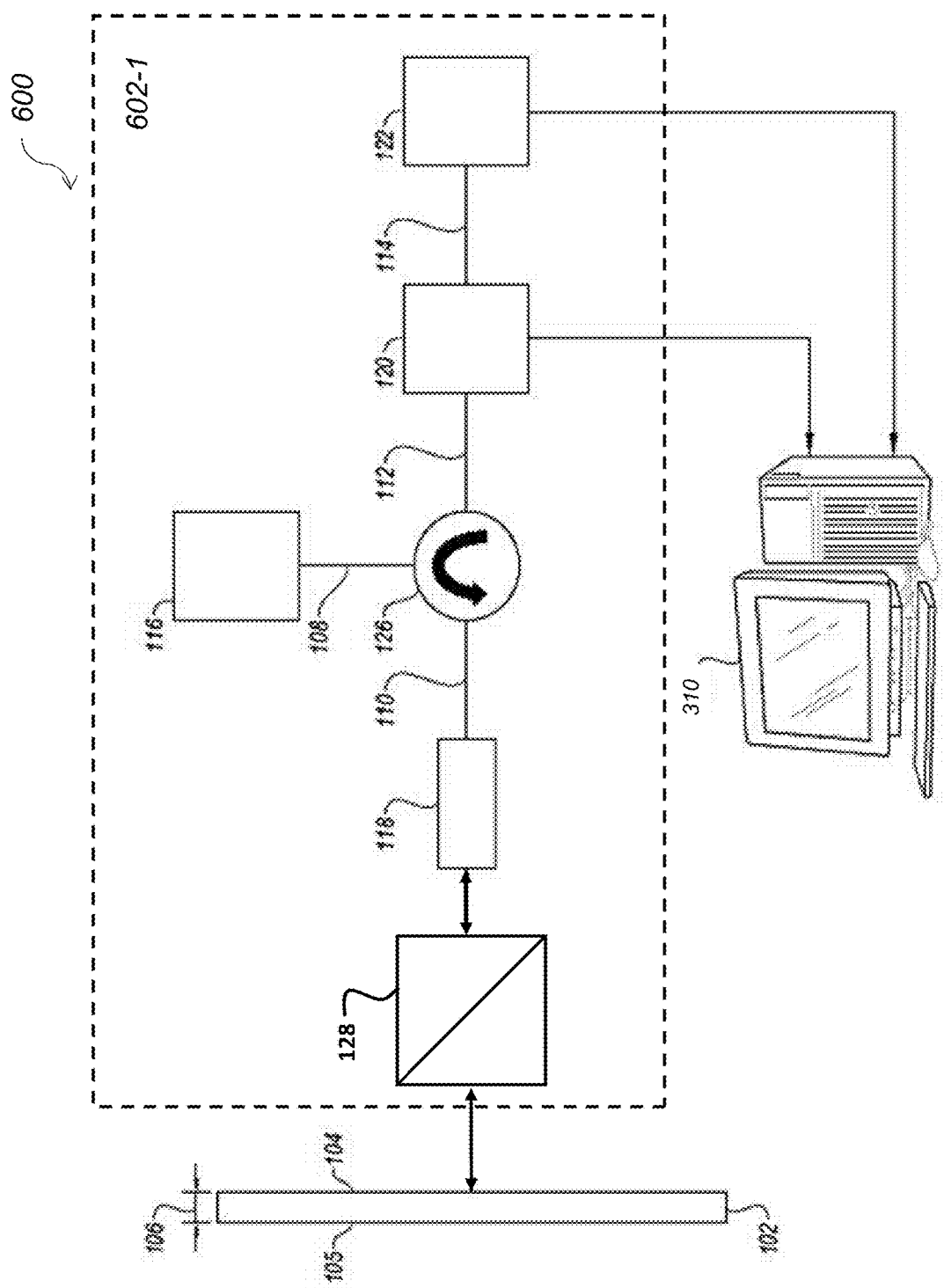
FIG. 6 illustrates an example frequency-domain optical coherence tomography (FD-OCT) sensor for the dual-sensor arrangement, in accordance with an embodiment of the present disclosure.

FIG. 6 illustrates an example frequency-domain optical coherence tomography (FD-OCT) sensor that may be an example of the first low-coherence sensor 302-1 used in the system 300 of FIG. 3, in accordance with an embodiment of the present disclosure. More specifically, FIG. 6 illustrates a first example FD-OCT sensor 602-1 ("first sensor 602-1") for inspecting the slab of material 102, arranged in accordance with at least some embodiments described in this disclosure. In general, the system 600 may be configured to inspect the slab of material 102 in order to determine a topography of a front surface 104 and/or a back surface 105 of the slab of material 102 in order to determine a thickness 106 of the slab of material 102. To perform the inspection, the first sensor 602-1 may include single mode optical fibers 108, 110, 112, and 114, a broadband light source 116, a beam assembly 118, a directional element 126, a polarizer 128, and an etalon filter 120 and a spectrometer 122 both controlled by the computer 310. The spectrometer 122 acting as a detector and the computer 310 may be an integrated with each other or may be separate entities.

The broadband light source 116 may be configured to emit a first light beam over the optical fiber 108. The directional element 126 may be configured to receive the first light beam from the broadband light source 116 over the optical fiber 108 and direct the first light beam to the beam assembly 118 over the optical fiber 110. The beam assembly 118 may be configured to receive the first light beam over the optical fiber 110 and split the first light beam into a first first-beam portion and a second first-beam portion. The beam assembly 118 may direct a first first-beam portion toward the polarizer 128. The beam assembly may reflect the second first-beam ("second first-beam reflection") portion toward the directional element 126. The operation of the beam assembly may be further discussed with relation to FIG. 9.

The polarizer 128 may be configured to allow light having a first polarization to pass through the polarizer. The polarizer 128 may also be configured to reject light having a second polarization, which may be orthogonal to the first polarization. Light of the first first-beam portion having the first polarization may pass through the polarizer 128 and be reflected by the slab of material 102. Light from the slab of material having the first polarization ("first first-beam reflection") may pass through the polarizer 128 and continue to the beam assembly 118.

The beam assembly 118 may be further configured to direct the first first-beam reflection as a part of a first combined beam (which also comprises a second first-beam reflection as later illustrated in FIG. 9) back to the directional element 126 over the optical fiber 110. The etalon filter 120 as controlled by the computer 310 may be configured to receive the first combined beam over the optical fiber, filter the same, and direct the filtered first combined beam over the optical fiber 114.

The spectrometer 122, as controlled by the computer 310, may be configured to receive the first combined beam over the optical fiber 114, and spectrally-analyze the light. The spectral-analysis of the light may include determining a topography of the front surface 104 and/or the back surface 105 of the slab of material 102 and/or determining the thickness 106 of the slab of material 102.

The computer 310 may be electrically coupled to the etalon filter 120 and to spectrometer 122. In these and other embodiments, the computer 310 may be configured to determine a topography of the front surface 104 and/or the back surface 105 of the slab of material 102 and/or determine the thickness 106 of the slab of material 102. The computer 310 may include a processor and a memory. The processor may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processor may interpret and/or execute program instructions and/or process data stored in the memory. The processor may execute instructions to perform operations with respect to the spectrometer 122 in order to determine a topography of the front surface 104 and/or the back surface 105 of the slab of material 102 and/or determine the thickness 106 of the slab of material 102. The memory may include any suitable computer-readable media configured to retain program instructions and/or data for a period of time. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media. Computer-executable instructions may include, for example, instructions and data that cause a general-purpose computer, special-purpose computer, or special-purpose processing device to perform a certain function or group of functions.

The etalon filter 120 may be a fixed etalon filter or may be a tunable etalon filter. In principle, if the optical thickness of the etalon filter 120 is known, and if the slab of material 102 is placed at a perfectly normal direction to the light from the beam assembly 118, the etalon filter 120 may be a fixed etalon filter and may not need calibration. However, if any of these conditions are not met, the etalon filter 120 may need to be a tunable etalon filter.

In one tunable embodiment, the etalon filter 120 may include multiple etalons with each etalon including two parallel reflective surfaces and with each etalon mounted in a computer-controlled motorized wheel. In another tunable embodiment, the etalon-filter 120 may include two parallel reflective surfaces with at least one of the two parallel reflective surfaces being mounted on a computer-controlled linear motion stage. In either of these tunable embodiments, the etalon filter 120 may be tunable in order to allow the optical thickness of the etalon filter to be similar to the thickness 106 of the particular slab of material 102 that is to be inspected by the first sensor 602-1. For example, the etalon filter 120 may include two parallel reflective surfaces separated by a distance, which is the optical thickness of the etalon filter 120, and during calibration of the etalon filter 120 the distance may be adjusted so that the distance is within 250 microns of the thickness 106 of the slab of material 102.

The first sensor 602-1 may be advantageously employed when the optical thickness (OT) of the etalon filter 120 is similar to the thickness of the slab of material 102 to be inspected, such as within 250 microns of the slab of material 102 to be inspected. The first sensor 602-1 may also be employed when interference happens between the front surface 104 of the slab of material 102 and a reflector 908 (shown in later FIG. 9), enabling a topography of the front surface 104 and/or the back surface 105 of the slab of material 102 to be determined.

If the approximate thickness of the slab 102 to be measured is known, then one etalon may be employed having a known and slightly larger thickness than the thickness of the slab of material 102 to measure the exact thickness 106 of the slab of material 102 using the first sensor 602-1. For example, in this situation, the first sensor 602-1 may be employed to measure the thickness 106 of the slab of material 102 by the following procedure:

1. Measuring the reference spectrum (as shown in FIG. 11A) of the broadband light source 116 by placing a mirror in place of the slab of material 102 using the first sensor 602-1 in which the etalon filter 120 is temporarily removed, or in which the slab of material 102 is replaced by a very thick etalon filter having an optical thickness much greater than the optical thickness 106 of the measured slab of material 102.
2. Measuring the signal spectrum (as shown in FIG. 11B) of the first combined beam comprising first first-beam reflection from the slab of material 102 having a known refractive index n, and passing through the etalon filter 120 having a known thickness which is known to be slightly larger than the thickness 106 of the measured slab of material 102. In an example, the signal spectrum may be calculated in accordance with the Equations 1-31 provided in the U.S. Pat. No. 9,915,564, issued Mar. 13, 2018, ("the '564 patent"), which is incorporated by reference in its entirety.

3. Calculating a normalized spectrum (as shown in FIG. 11C) by dividing the signal spectrum by the reference spectrum. In an example, the normalized spectrum may be calculated in accordance with the Equation 32 provided in the '564 patent.

4. Calculating the frequency $\Omega$ of observed oscillations in the normalized spectrum.

5. Calculating the thickness 106 of the slab of material 102. In an example, the normalized spectrum may be calculated in accordance with the Equation 34 provided in the '564 patent.

The frequency calculation using a normalized signal in step 3 in the above procedure may be performed using one of many standard methods of signal processing including, but not limited to, Fourier transform methods, fitting oscillating model function methods, and investigating position of the maxima and minima of the oscillations shown in FIG. 11C.

Similarly, if the approximate thickness of the measured slab of material 102 is known, then one etalon having a known and slightly smaller thickness than the slab of material 102 may be employed to measure the exact thickness 106 of the slab of material 102 using the first sensor 602-1. For example, in this situation, the first sensor 602-1 may be employed to measure the thickness 106 of the slab of material 102 by the following procedure:

1. Measuring the reference spectrum (as shown in FIG. 11A) of the broadband light source 116 by placing a mirror in place of the slab of material 102 using the first sensor 602-1 in which the etalon-filter 120 is temporarily removed, or in which the slab of material 102 is replaced by a very thick etalon filter having an optical thickness much greater than the optical thickness 106 of the measured slab of material 102.

2. Measuring the signal spectrum (as shown in FIG. 11B) of the first combined beam comprising the first first-beam reflection reflected from the slab of material 102 having a known refractive index n, and passing through the etalon filter 120 having a known thickness which is known to be slightly smaller than the thickness 106 of the measured slab of material 102.

3. Calculating a normalized spectrum by dividing the signal spectrum by the reference spectrum as shown in FIG. 11C. In an example, the normalized spectrum may be calculated in accordance with the Equation 32 provided in the '564 patent.

4. Calculating the frequency $\Omega$ of observed oscillations in the normalized spectrum.

5. Calculating the thickness 106 of the slab of material 102. In an example, the normalized spectrum may be calculated in accordance with the Equation 34 provided in the '564 patent.

Measurements using N etalons having different optical thicknesses may be performed using the following steps, where N=2, 3, . . . :

1. Measuring the reference spectrum (as shown in FIG. 11A) of the broadband light source 116 by placing a mirror in place of the slab of material 102 using the first sensor 602-1 in which the etalon filter 120 is temporarily removed, or in which the slab of material 102 is replaced by very thick etalon filter of having an optical thickness much greater than the optical thickness 106 of the measured slab of material 102.

2. Measuring the signal spectra (as shown in FIG. 11B) of the first first-beam reflection reflected from the slab of material 102 having a known refractive index n, and passing through each of the employed etalons i=1, 2.

3. Calculating a normalized-spectra (as shown in FIG. 11C) by dividing the signal spectra by the reference spectrum.

4. Calculating the frequency $\Omega_i$ of observed oscillations in the normalized spectrum.

6. Finding thickness of the slab of material using an approximate-solution 'd' of the (overdetermined) system of equations. In an example, the thickness of the slab of material may be determined in accordance with the Equations 33 and 36 provided in the '564 patent.

The system 600 may additionally include a second sensor (not shown) positioned opposite the first sensor 602-1 on the back surface 105 side of the slab of material 102. The system 600 may use the first sensor 602-1 and the second sensor to inspect the slab of material 102 in order to determine a topography of a front surface 104 and/or a back surface 105 of the slab of material 102 in order to determine a thickness 106 of the slab of material 102. In some embodiments, the second sensor may be configured similarly to the first sensor 602-1. Additionally or alternatively, the second sensor may be configured in another manner, such as, for example, similar to a sensor 702-1 of FIG. 7 or a sensor 802-1 of FIG. 8. In these or other embodiments, the second sensor may include a second polarizer that may be configured to be orthogonal to the polarizer 128. For example, the polarizer 128 may be configured to allow light having the first polarization to pass through the polarizer 128. The polarizer 128 may be configured to reject light of the second polarization. The second polarization may be orthogonal to the first polarization. The second polarizer may be configured to reject light having the first polarization and allow light of the second polarization to pass through the second polarizer.

Figure 7:
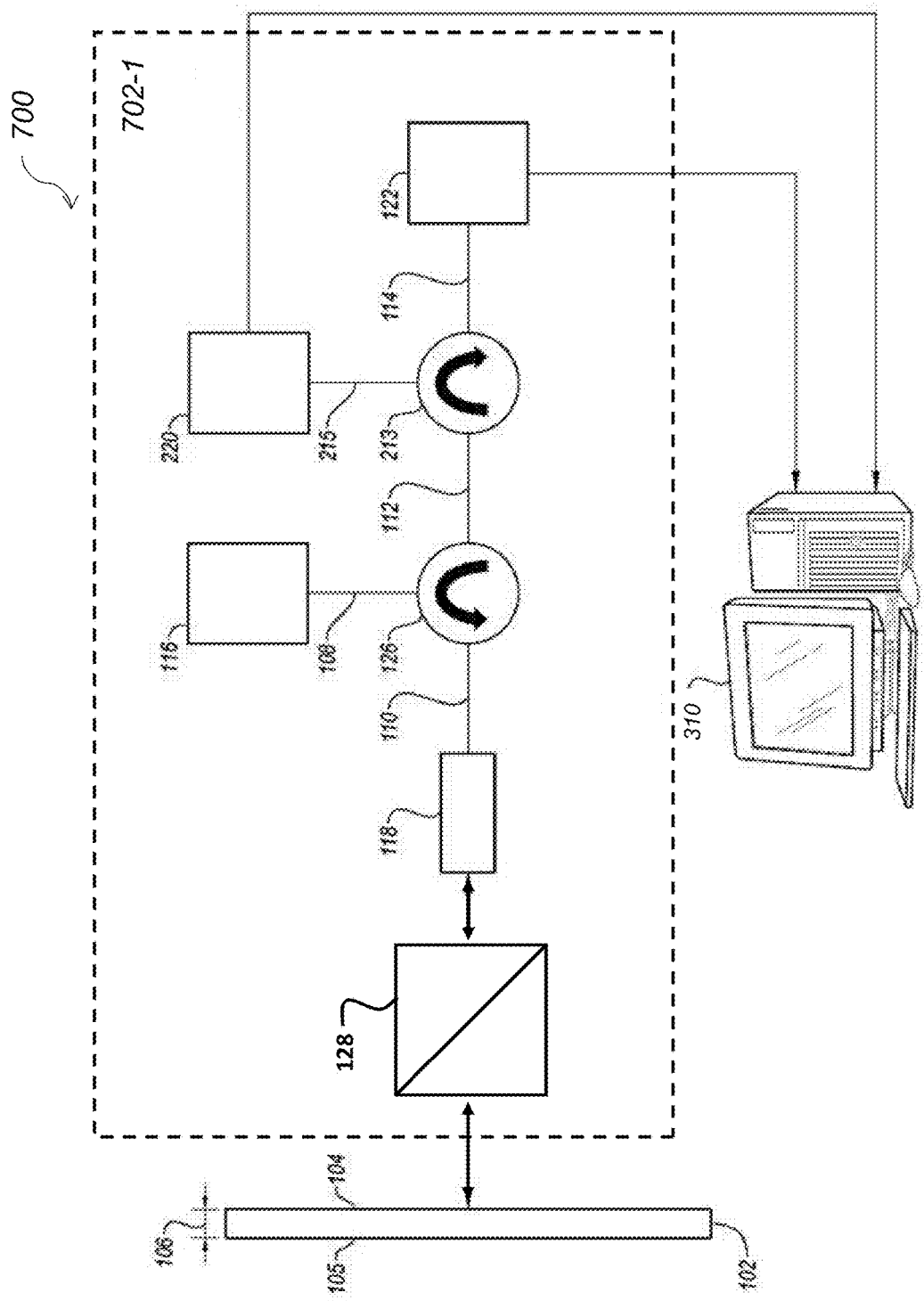
FIG. 7 illustrates yet another example frequency-domain optical coherence tomography (FD-OCT) sensor for the dual-sensor arrangement, in accordance with an embodiment of the present disclosure.

FIG. 7 illustrates yet another example frequency-domain optical coherence tomography (FD-OCT) sensor that may be an example of the first low-coherence sensor 302-1 used in the system 300 of FIG. 3, in accordance with an embodiment of the present disclosure. More specifically, FIG. 7 illustrates a system 700 which includes a sensor 702-1 which may be similar to the first sensor 602-1 of FIG. 6. Accordingly, the description of FIG. 7 illustrates the differences with respect to FIG. 6.

In addition to elements that the sensor 702-1 has in common with the first sensor 602-1 of FIG. 6, the sensor 702-1 may include a second directional element 213, an etalon filter 220, and a single mode optical fiber 215. The second directional-element 213 may be configured to receive the first combined beam from the directional element 126 over the optical fiber 112 and direct the first combined beam to the etalon filter 220 over the optical fiber 215. The etalon filter 220 may be configured similarly to the etalon filter 120 of FIG. 1, except that the etalon filter 220 may be configured to receive the first combined beam from the second directional element 213 over the optical fiber 215 after the light has been reflected from the slab of material 102 and direct the first combined-beam back to the second directional element 213 over the optical fiber 215. The spectrometer 122 in FIG. 7 may then be configured to receive the first combined beam from the second directional element 213 over the optical fiber 114.

The system 700 may additionally include a second sensor (not shown) positioned opposite the sensor 702-1 on the back-surface-105 side of the slab of material 102. The system 700 may use the sensor 702-1 and the second sensor to inspect the slab of material 102 in order to determine a topography of a front surface 104 and/or a back surface 105 of the slab of material 102 in order to determine a thickness 106 of the slab of material 102. In some embodiments, the second sensor may be configured similarly to the sensor 702-1. Additionally or alternatively, the second sensor may be configured in another manner, such as, for example, similar to a sensor 602-1 of FIG. 6 or a sensor 802-1 of FIG. 8. In these or other embodiments, the second sensor may include a second polarizer that may be configured to be orthogonal to the polarizer 128. For example, the polarizer 128 may be configured to allow light having a first polarization to pass through the polarizer 128. The polarizer 128 may be configured to reject light of a second polarization. The second polarization may be orthogonal to the first polarization. The second polarizer may be configured to reject light having the first polarization and allow light of the second polarization to pass through the second polarizer.

Figure 8:
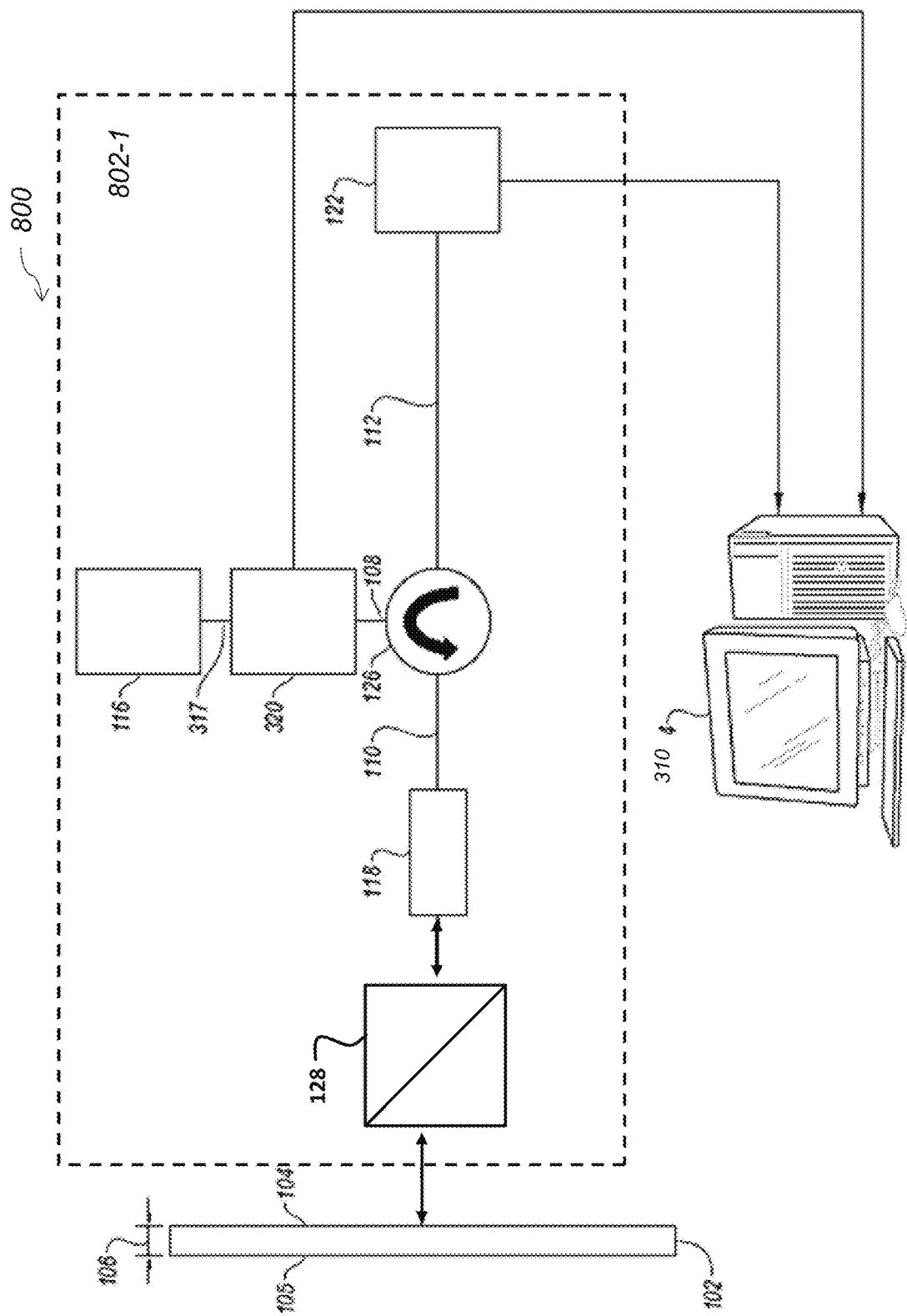
FIG. 8 illustrates yet another example frequency-domain optical coherence tomography (FD-OCT) sensor for the dual-sensor arrangement, in accordance with an embodiment of the present disclosure.

FIG. 8 illustrates yet another example frequency-domain optical coherence tomography (FD-OCT) sensor that may be an example of the first low-coherence sensor 302-1 used in the system 300 of FIG. 3, in accordance with an embodiment of the present disclosure. More specifically, FIG. 8 illustrates a system 800 including a third example sensor 802-1 for inspecting a slab of material 102, arranged in accordance with at least some embodiments described in this disclosure. Since the sensor 802-1 in FIG. 8 is similar in many respects to the sensor 602-1 of FIG. 6, only the differences have been discussed herein.

In additional to elements that the sensor 802-1 has in common with the sensor 602-1 of FIG. 6, the sensor 802-1 of FIG. 8 depicts a single mode optical fiber 317 and an etalon filter 320. The etalon filter 320 may be configured similarly to the etalon filter 120 of FIG. 6, except that the etalon filter 320 may be configured to receive the first combined beam over the broadband light source 116 over the optical fiber 317 before the first first-beam portion is directed toward the slab of material 102. Then, after filtering the first first-beam portion, the etalon filter 320 directs the first first-beam portion over the optical fiber 108 to the directional element 126. Then, after the first first-beam reflection has been reflected from the slab of material 102, the spectrometer 122 may be configured to receive the first combined beam from the directional element 126 over the optical fiber 112.

The system 800 may additionally include a second sensor (not shown) positioned opposite the sensor 802-1 on the back-surface-105 side of the slab of material 102. The system 800 may use the sensor 802-1 and the second sensor to inspect the slab of material 102 in order to determine a topography of a front surface 104 and/or a back surface 105 of the slab of material 102 in order to determine a thickness 106 of the slab of material 102. In some embodiments, the second sensor may be configured similarly to the sensor 802-1. Additionally or alternatively, the second sensor may be configured in another manner, such as, for example, similar to a sensor 602-1 of FIG. 6 or a sensor 702-1 of FIG. 7. In these or other embodiments, the second sensor may include a second polarizer that may be configured to be orthogonal to the polarizer 128. For example, the polarizer 128 may be configured to allow light having a first polarization to pass through the polarizer 128. The polarizer 128 may be configured to reject light of a second polarization. The second polarization may be orthogonal to the first polarization. The second polarizer may be configured to reject light having the first polarization and allow light of the second polarization to pass through the second polarizer.

The sensor 702-1 of FIG. 7 and the sensor 802-2 of FIG. 8 may operate according to similar principles. For example, since all components of the optical systems 700 and 800 may be linear in light intensity, the ordering of the reference etalon (the etalon filter) and the sample (the slab of material) may not affect the signal produced by the system. Therefore, the sensor 702-1 of FIG. 7 the sensor 802-1 of FIG. 8 may produce substantially the same signal. The main difference between the sensor 702-1 of FIG. 7 and the sensor 802-1 of FIG. 8 may be the use of a reference etalon operating in the transitive mode and the reflective mode, respectively.

Figure 9:
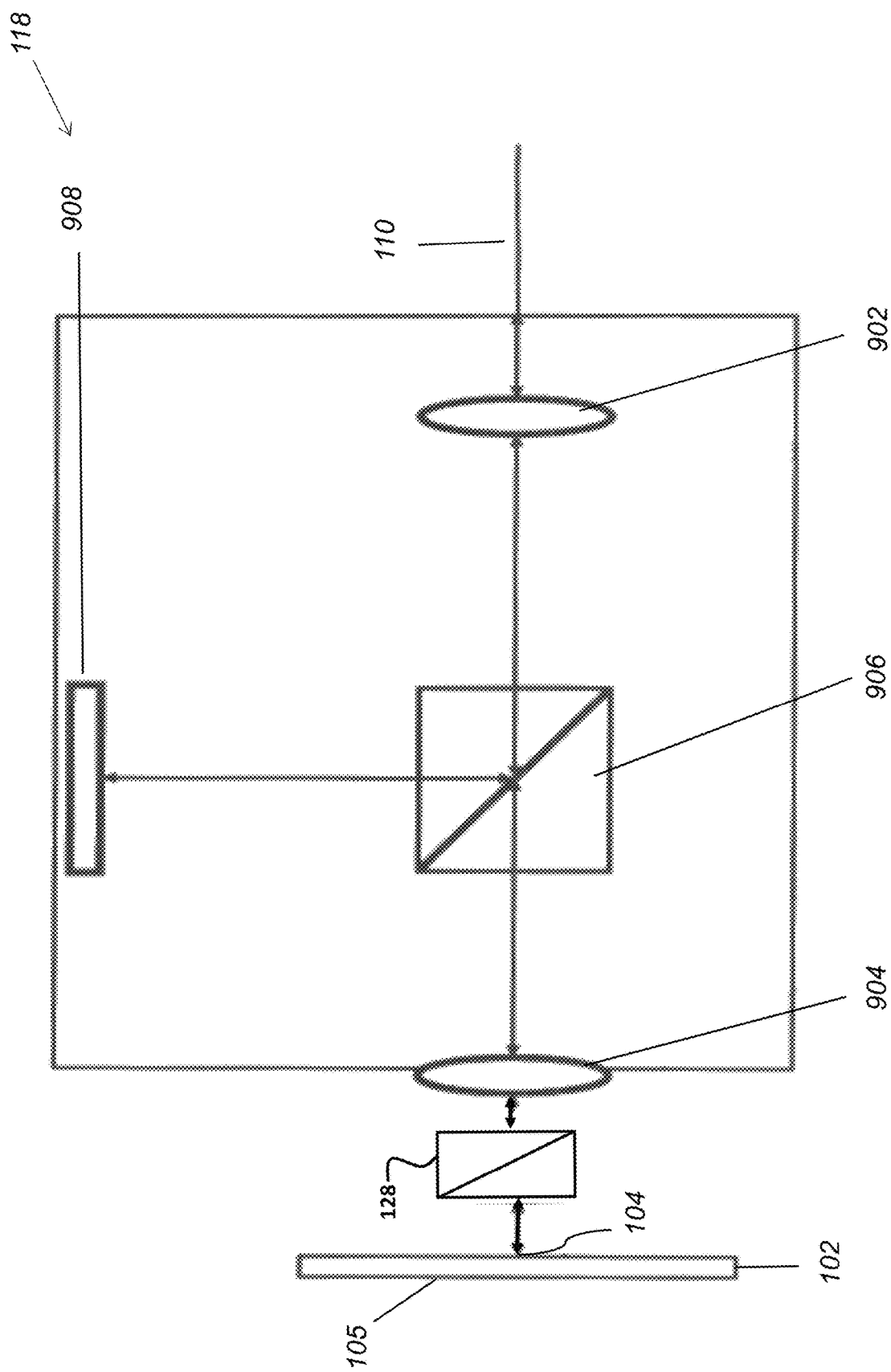
FIG. 9 illustrates an example beam-assembly for the FD-OCT sensor as depicted in FIGS. 6 to 8, in accordance with an embodiment of the present disclosure.

FIG. 9 illustrates an example beam assembly 118, arranged in accordance with at least some embodiments described in this disclosure, and refers to the beam-assembly 118 in the sensor 302-1 as depicted in FIGS. 6 to 8. The beam assembly 118 may include lenses 902 and 904. The beam assembly 118 may also optionally include a beam-splitter 906 and a reflector 908. The lens 902 may be configured to receiving the first light beam over the optical fiber 110 and collimate and direct the light toward the beam splitter 906. The beam splitter 906 may be configured to split the first light beam from the lens 902 into first first-beam portion and second first-beam portions, direct the first first-beam portion of the light toward the lens 904, and direct the second first-beam portion onto a reflector 908. The lens 904 may be configured to receive the first first-beam portion of the light from the beam splitter 906, direct the first first-beam portion of the light toward the slab of material 102, and direct a first first-beam reflection of the first first-beam portion reflected off a first side of the slab of material 102 back toward the beam splitter 906. Further, the reflector 908 may be configured to receive the second first-beam portion of the light from the beam splitter 906 and result in a second first-beam reflection of the second first-beam portion back toward the beam splitter 906. The beam splitter 906 may be further configured to combine the first first-beam reflection (reflected from the slab of material 102) and the second first-beam reflection of the light (reflected from the reflector 908) into the first combined beam. The first combined beam is directed toward the lens 902, which in turn is directed over the optical-fiber 110.

The beam assembly 118 may be employed to gauge the optical path difference (OPD) between the first first-beam reflection and the second first-beam reflection, which can be used to measure the distance between the front surface 104 of the slab of material 102 and the lens 904.

In an example, as part of further exemplarily performed characterization of the slab of material, topography of the front surface 104 of the slab of material 102 may be determined by placing a slab of material 102 on an XY motion stage perpendicular to the light beam impinging the front surface 104 of the slab of material 102, with the front surface 104 being parallel to the motion of the XY motion stage, and by collecting a data set comprising the data set on a large number M comprising the $x_j$ and $y_j$ coordinates of the point where the beam is impinging the front surface 104 of the slab of material 102 and the distance between stationary lens 504 and the front surface 104 of the slab of material 102 $z_j$, where j=1 . . . M. The set of points $(x_j, y_j, z_j)$ can then be used to construct a three-dimensional map of the front surface 104 of the slab of material 102.

Further the second low-coherence sensor 302-2 may also be the FD-OCT sensor like the first low-coherence sensor 302-1 as discussed in FIG. 6. More specifically, the second low-coherence sensor 302-2 may be configured to receive a second-light beam from either the same broadband light-source 116 as depicted in preceding figures or a separate broadband light source. Like the first low-coherence sensor 302-1, the second low-coherence sensor 302-2 may be configured to split the second light beam into a first second-beam portion and a second second-beam portion through a second beam splitter (analogous to the beam-splitter 918), and thereafter irradiate the second-side or back-side 105 of the slab of material 102 with the first second-beam portion and a second reflector (within the beam-assembly) with the second second-beam portion. Further, the second low-coherence sensor 302-2 may be configured to receive a first second-beam reflection of the first second-beam portion that reflects off the second side 104 of the slab of material 102 and also receive a second second-beam reflection of the second second-beam portion that reflects off the second reflector.

Further, the beam-assembly within the second low-coherence sensor 302-2 combines the first second-beam reflection and the second second-beam reflection into a second combined beam, and directs the second combined beam to a second detector (that corresponds to combination of etalon filter, spectrometer, array detector with respect to the second low-coherence sensor 302-2) to trigger an analysis of the second combined beam by the computing system 310. In other example, both the first 302-1 and the second low-coherence sensor 302-2 may be ported to different systems.

Figure 10:
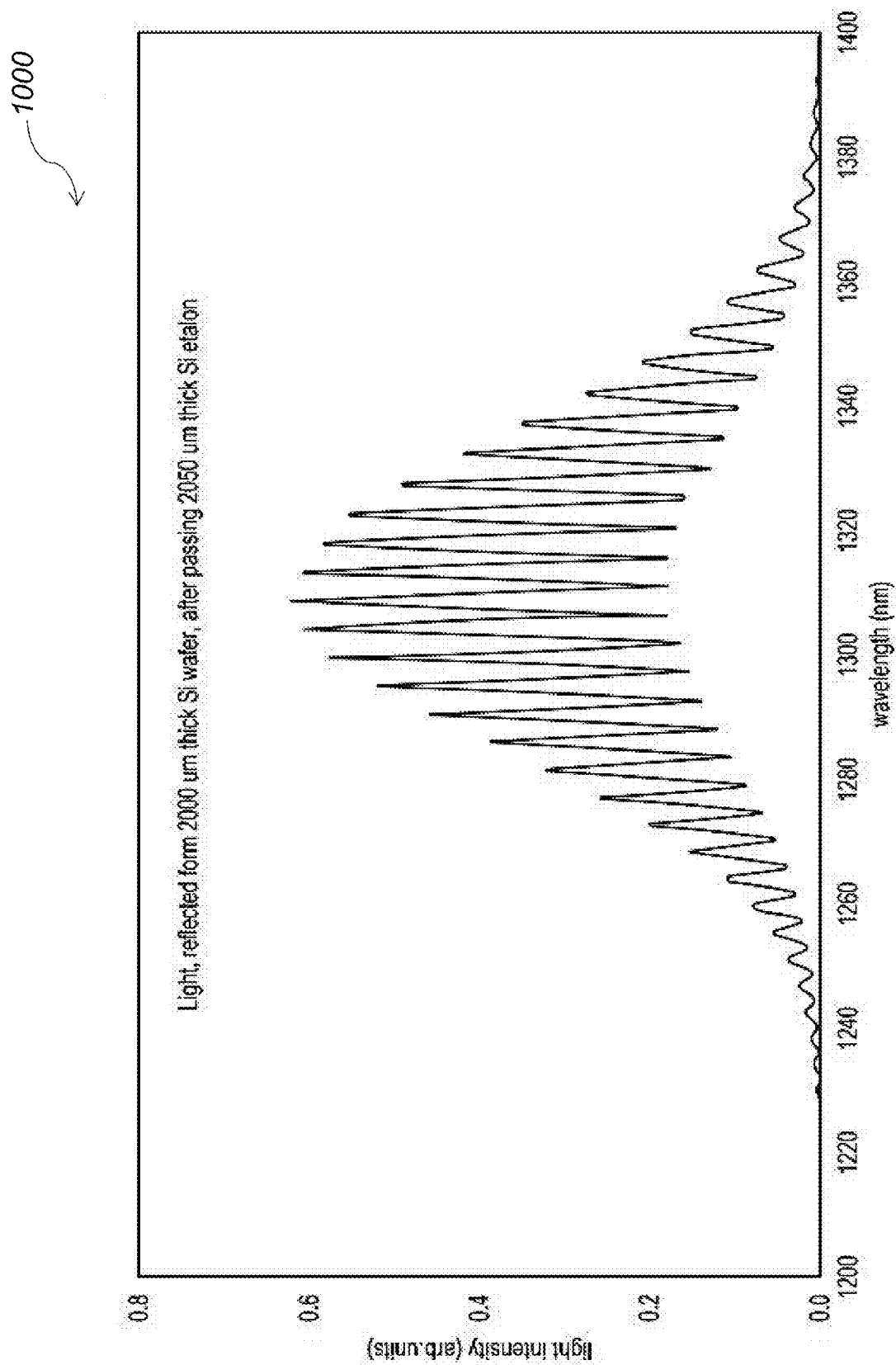
FIG. 10 illustrates a simulated-spectrum that may be obtained using any of the example systems of FIGS. 6-9.

FIG. 10 illustrates a simulated spectrum 1000 that may be obtained using any of the example systems of FIGS. 6-9. In particular, the spectrum 1000 may be obtained by the spectrometer 122 of any of the systems of FIGS. 6-9 after the light has been reflected from or transmitted through the slab of material 102, where the slab of material is a 2000 um thick Si wafer, and the etalon filter is a 2050 um thick Si etalon.

FIG. 11A illustrates a simulated spectrum 1100 that may be measured by a spectrometer of any of the example systems of FIGS. 6-9.

FIG. 11B illustrates a simulated spectrum 1110 that may be reflected from the slab of material 102.

FIG. 11C illustrates a simulated normalized spectrum 1120 that may result from dividing the simulated spectrum 1110 using the simulated spectrum 1100. In particular, the simulated spectrum 1100 is of a first light beam and the second light beam emitted from the light source 116 having a bandwidth half width half maximum 25 nm and centered at 1250 nm, as measured by a spectrometer having a bandwidth of 0.2 nm. The simulated spectrum 1110 is reflected from the slab of material 102 having a thickness of 0.6 mm, a refractive index of 3.5, and a reflection coefficient of each surface of 0.5, after having passed through an etalon filter 120 having a thickness of 0.74 mm, a refractive index of 3.5, and a reflection coefficient of each surface of 0.5.

Figure 12:
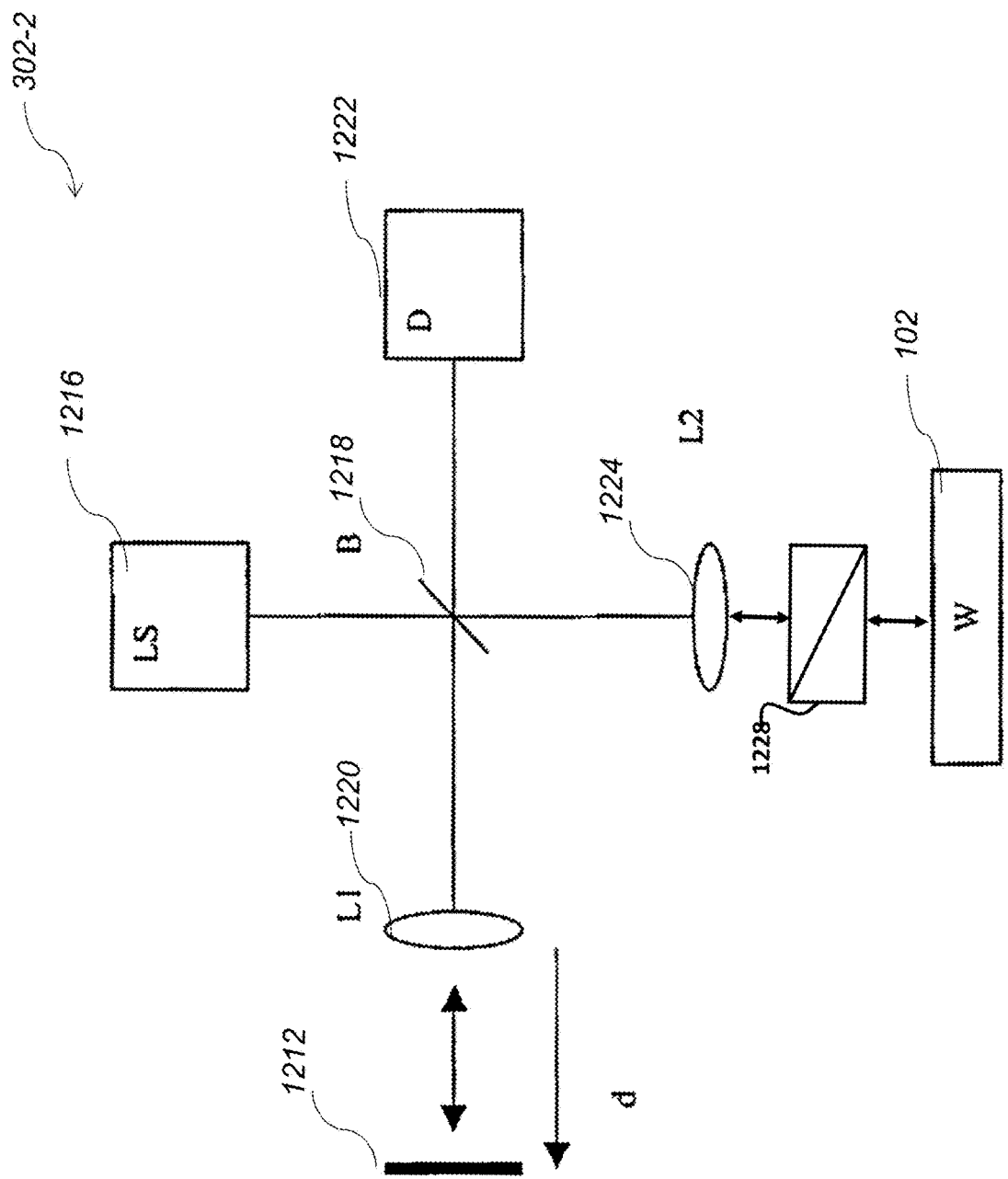
FIG. 12 illustrates an example time-domain optical coherence tomography (TD-OCT) sensor for the dual-sensor arrangement, in accordance with an embodiment of the present disclosure.
Figure 13:
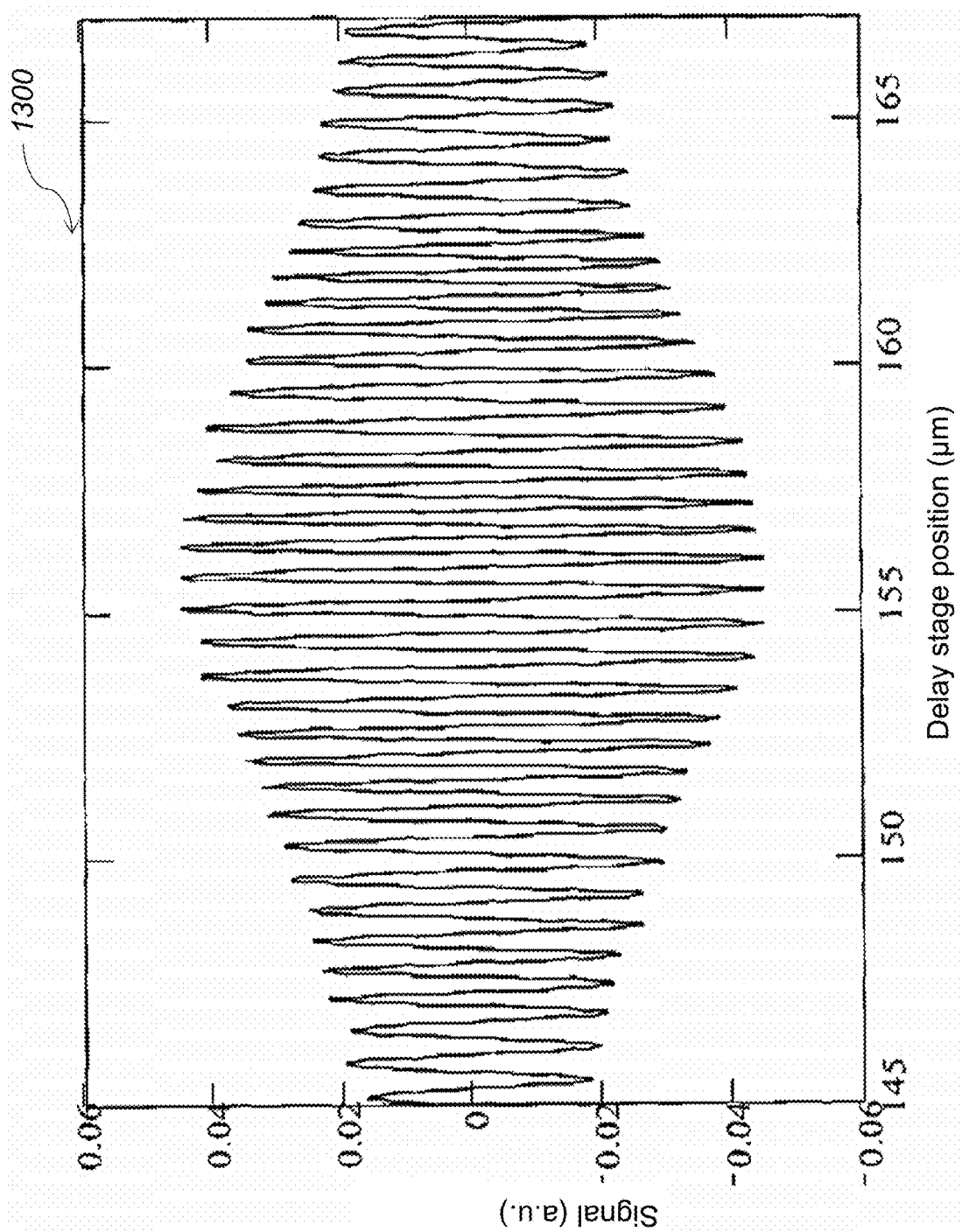
FIG. 13 illustrates a simulated interferogram as obtained using the example systems of FIG. 12, in accordance with an embodiment of the present disclosure.

As may be clear from the description of forthcoming figures, in another example, the second low-coherence sensor 302-2 may be dissimilar with respect to the first low-coherence sensor 302-1 such that the second-sensor 302-2 may be a time-domain optical coherence tomography (TD-OCT) sensor as illustrated with FIG. 12 to FIG. 13. However, in other examples, both the first low-coherence sensor 302-1 and the second low-coherence sensor 302-2 may be TD-OCT sensors as illustrated in FIG. 12 and FIG. 13.

FIG. 12 illustrates an example time-domain optical coherence tomography (TD-OCT) sensor for the dual-sensor arrangement, in accordance with an embodiment of the present disclosure. More-specifically, FIG. 12 illustrates a Michelson-interferometer in which one of the arms includes a delay-stage d.

A light-beam emitted by a broadband light source 1216 (which may be a second-light beam emitted by the broadband light source 116) is divided by a beam-assembly or a beam-splitter 1218 into first second-beam portion and second second-beam portion. The second second-beam portion (which may be reference-beam) propagating through a beam shaping lens 1220 is reflected by a mirror 1212 to produce a second second-beam reflection. The delay-stage comprising the mirror 1212 and the lens 1220 is attached to an electromechanical actuator for varying the length of the optical path between the lens 1220 and the mirror 1212. The second second-beam reflection passes again through the lens 1220 and the beam-assembly 1218, and is detected by a second detector 1222.

The first second-beam portion (signal) propagates through another beam shaping lens 1224, a polarizer 1228, and is reflected by the slab of material 102 (e.g. by the second side 104 of slab of material) to produce a first second-beam reflection. The first second-beam reflection propagates through the polarizer 1228, then through the lens 1224, and finally is directed by the beam-splitter 1218 towards the second detector 1222. The first second-beam reflection and the second second-beam reflection are directed to the second detector 1222 as the second combined beam. When the path of first second-beam portion and the second second-beam portion are approximately equal, interference fringes are observed. The analysis of the interference leads to measurement of the thickness of the slab of material 102. In an example, the analysis of interference-fringes that result in the determination of the thickness of the slab of material is done based on the Equations 1 to 3 as provided with respect to the U.S. Pat. No. 7,116,429, issued Oct. 3, 2006, (the '429 patent) which is incorporated by reference in its entirety.

In another example, the Michelson interferometer arrangement in FIG. 12 employs fiber-optic components, such that the light propagates through the single mode optical-fibers. Further, the beam-splitter 1218 is replaceable by a 4×4 fiber optic-coupler. More specifically, in order to optimize the amplitude of the observed interference fringes, the state of polarization in the first second-beam portion and second second-beam portion are matched by a fiber-optic polarization controller PC. The fiber optic polarization controller is based upon a stress induced birefringence effect and is essentially similar to one commercially available from Thorlabs Inc., model FPCO31. Thorlabs catalog "Tools of trade", Vol 18, 2006.

FIG. 13 illustrates a simulated interferogram as obtained using the example second low-coherence sensor 302-2 of FIG. 12, in accordance with an embodiment of the present disclosure.

Figure 14:
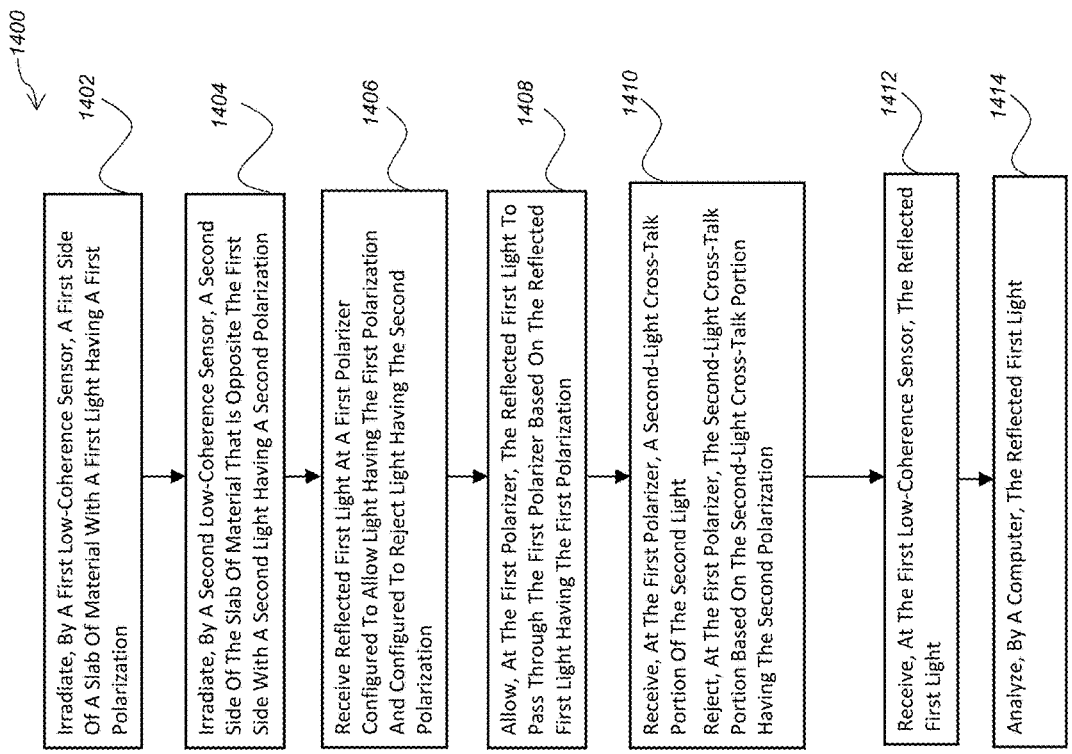
FIG. 14 illustrates an example method of inspecting a slab of material, in accordance with an embodiment of the present disclosure.

FIG. 14 is a flowchart of an example method 1400 for inspecting a slab of material arranged in accordance with at least some embodiments described in this disclosure. The method 1400 may be implemented, in some embodiments, by a dual-sensor arrangement with respect to FIGS. 3 and 4, and the sensors as depicted in FIGS. 6 to 9 and 12. Although illustrated as discrete blocks, various blocks may be divided into additional blocks, combined into fewer blocks, or eliminated, depending on the desired implementation.

The method 1400 may include receiving, at a first low-coherence sensor, a first light beam, from a first broadband light source. The first low-coherence sensor 302-1 of FIGS. 3 and 4 may be an example of the first low-coherence sensor of method 1400. The broadband light source 116 of FIGS. 6-8 may be an example of the first broadband light source. In some embodiments, the first light beam may be polarized when it is received from the broadband light source.

The method 1400 may further include splitting, at the first low-coherence sensor, the first light beam into a first first-beam portion and a second first-beam portion. The splitting of method 1400 may take place at a beam splitter of which the beam splitter 906 of FIG. 9 may be an example.

The method 1400 may further include irradiating, at the first low-coherence sensor, a first reflector with the second first-beam portion. The reflector 908 of FIG. 9 may be an example of the first reflector of method 1400.

Block 1402 may include irradiating, by the first low-coherence sensor, a first side of a slab of material with a first light having a first polarization. The first low-coherence sensor 302-1 of FIGS. 3 and 4, and/or the sensors 602-1, 702-1, and 802-1 of FIGS. 6, 7, and 8 respectively, may be an example of the first low-coherence sensor. The slab of material 102 of FIGS. 3, 4, and 6-9 may be an example of the slab of material. The first side 104 of FIGS. 4 and 6-9 may be an example of the first side. As may be understood, the first first-beam portion may act as the first light.

The first light may be polarized to the first polarization at any time prior to irradiating the first side of the slab of material. For example, the first light beam may be polarized before the first light is received by the first low-coherence sensor. Additionally or alternatively, the first light may be polarized at the first low-coherence sensor before the first light irradiates the first side of the slab of material. For example, the first low-coherence sensor may include a polarizer, for example, the polarizer 306 of FIGS. 3 and 4, and/or the polarizer 128 of FIGS. 6-9. The polarizer in the first low-coherence sensor may be configured to polarize the first light to the first polarization any time before it is used to irradiate the slab of material.

Block 1404 may include irradiating, by a second low-coherence sensor, a second side of the slab of material that is opposite the first side with a second light having a second polarization. The second low-coherence sensor 302-2 of FIGS. 3 and 4, may be an example of the second low-coherence sensor of block 1404. Additionally or alternatively, the second sensor may be similar to any of the sensors 602-1, 702-1, and 802-1 of FIGS. 6, 7, and 8 respectively. The second light may be similar to the first light in that the second light may be received from a broadband light source and split into a first second-beam portion and a second second-beam portion. The second second-beam portion may act as the second light. The second light may be polarized to the second polarization at any time prior to irradiating the second side of the slab of material. The second polarization may be orthogonal to the first light. The second side 105 of FIGS. 4 and 6-9 may be an example of the second side.

Block 1406 may include receiving reflected first light at a first polarizer. The first polarizer may be configured to allow light having the first polarization and configured to reject light having the second polarization. The reflected first light may include the first light that has been reflected from the first side of the slab of material. The first polarizer 306 of FIGS. 3 and 4 may be an example of the first polarizer of block 1406. As illustrated in FIGS. 5A and 5C, the first polarizer may be configured to transmit light having the first polarization and substantially reject light having the second polarization.

Block 1408 may include allowing, at the first polarizer, the reflected first light to pass through the first polarizer based on the reflected first light having the first polarization.

Block 1410 may include receiving, at the first polarizer, a second-light cross-talk portion of the second light. The higher vertical dotted line of FIG. 4 may be an illustration of the second-light cross-talk portion of block 1410.

Block 1410 may include rejecting, at the first polarizer, the second-light cross-talk portion based on the second-light cross-talk portion having the second polarization. The higher horizontal dotted line of FIG. 4 may be an illustration of the rejection of the second-light cross-talk portion of block 1410.

Block 1412 may include receiving, at the first low-coherence sensor, the reflected first light. The higher upward facing arrow of FIG. 4 may illustrate the reception of the reflected first light at the first low-coherence sensor.

Block 1414 may include analyzing, by a computer, the reflected first light. The computer 310 of FIGS. 3, and 6-8 may be an example of the computer of block 1414. The analysis of the computer may include analyzing an interference pattern and/or a spectrum with respect to the reflected first light.

The method 1400 may further include receiving reflected second light at a second polarizer. The second polarizer may be configured to allow light having the second polarization and configured to reject light having the first polarization. The reflected second light may include the second light that has been reflected from the second side of the slab of material. The second polarizer 308 of FIGS. 3 and 4 may be an example of the second polarizer. As illustrated in FIGS. 5B and 5D, the second polarizer may be configured to transmit light having the second polarization and substantially reject light having the first polarization.

The method 1400 may further include allowing, at the second polarizer, the reflected second light to pass through the second polarizer based on the reflected second light having the second polarization.

The method 1400 may further include receiving, at the second polarizer, a first-light cross-talk portion of the first light. The lower vertical dotted line of FIG. 4 may be an illustration of the first-light cross-talk portion.

The method 1400 may further include rejecting, at the second polarizer, the first-light cross-talk portion based on the first-light cross-talk portion having the first polarization. The lower horizontal dotted line of FIG. 4 may be an illustration of the rejection of the first-light cross-talk portion.

The method 1400 may further include receiving, at the second low-coherence sensor, the second reflected light. The lower downward facing arrow of FIG. 4 may illustrate the reception of the reflected second light at the second low-coherence sensor.

The method 1400 may further include analyzing, by the computer, the reflected second light. The analysis of the computer may include analyzing an interference pattern and/or a spectrum with respect to the reflected second light. The analysis of the computer may further include comparing the one or more characteristics of the reflected first light to reflected second light.

One skilled in the art will appreciate that, for this and other methods disclosed in this disclosure, the functions performed in the methods may be implemented in differing order. Furthermore, the outlined operations are only provided as examples, and some of the operations may be optional, combined into fewer operations, or expanded into additional operations without detracting from the essence of the disclosed embodiments. For example, in some embodiments, blocks 1404 may be performed prior to, or at the same time as the block 1402.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The invention claimed is:

1. An apparatus for inspecting a slab of a material, the apparatus comprising:
    a computing system configured to analyze light received at a first detector and a second detector;
    a first low-coherence sensor configured to:
        receive a first light beam from a first broadband light source, the first light beam having a first polarization;
        split the first light beam into a first first-beam portion and a second first-beam portion;
        irradiate a first-side of the slab of material with the first first-beam portion, the first-side of the slab of material being in a first optical path of the first first-beam portion;
        irradiate a first reflector with the second first-beam portion, the first reflector being in a second optical path of the second first-beam portion, the second optical path being different from the first optical path;
        receive a first first-beam reflection of the first first-beam portion that reflects off the first side of the slab of material;
        receive a second first-beam reflection of the second first-beam portion that reflects off the first reflector;
        combine the first first-beam reflection and the second first-beam reflection into a first combined beam; and
        direct the first combined beam to the first detector to trigger an analysis of the first combined beam by the computing system;
    a second low-coherence sensor configured to irradiate with second light a second side of the slab of material that is opposite the first side and detect a reflection therefrom at the second detector to trigger an analysis by the computing system, the second light having a second polarization different from the first polarization; and
    a first polarizer of the first low-coherence sensor, the first polarizer configured to:
        allow light having the first polarization to pass through it;
        reject light having the second polarization;
        receive a second-beam cross-talk portion of the second light that passes through the slab of material from the second side to the first side; and
        reject the second-beam cross-talk portion based on the second-beam cross-talk portion having the second polarization, the rejecting being such that the second-beam cross-talk portion is prevented from being included in the first combined beam.

2. The apparatus of claim 1, wherein the second low-coherence sensor is configured to:
    receive a second light beam from a second broadband light source;
    split the second light beam into a first second-beam portion and a second second-beam portion;
    irradiate the second-side of the slab of material with the first second-beam portion such that the first second-beam portion is used as the second light;
    irradiate a second reflector with the second second-beam portion;
    receive a first second-beam reflection of the first second-beam portion that reflects off the second side of the slab of material;
    receive a second second-beam reflection of the second second-beam portion that reflects off the second reflector;
    combine the first second-beam reflection and the second second-beam reflection into a second combined beam; and
    direct the second combined beam to the second detector to trigger an analysis of the second combined beam by the computing system.

3. The apparatus as claimed in claim 1, wherein a propagation of light within each of the sensors is implemented through a network of single-mode optical fibers.

4. The apparatus as claimed in claim 1, wherein the second polarization is orthogonal to the first polarization.

5. The apparatus as claimed in claim 1, wherein the second low-coherence sensor includes a second polarizer configured to:
   allow light having the second polarization to pass through it;
   reject light having the first polarization;
   receive a first-beam cross-talk portion of the second first-beam portion that passes through the slab of material from the first side to the second side; and
   reject the first-beam cross-talk portion based on the first-beam cross-talk portion having the first polarization, the rejecting being such that the first-beam cross-talk portion is prevented from being included in the second combined beam.

6. The apparatus as claimed in claim 1, wherein the second low-coherence sensor is a time-domain optical coherence topography (TD-OCT) sensor and comprises:
   a low coherence light source configured to provide a second light beam;
   a fiber optic coupler configured to receive the second light beam from the source;
   a first beam shaping lens system coupled to the fiber-optic coupler and configured to direct a first second-beam portion of the second light beam toward the second side of the slab of material such that the first second-beam portion is used as the second light to irradiate the second side of the slab of material;
   a second beam shaping lens system coupled to the fiber-optic coupler and configured to direct a second second-beam portion toward a second reflector such that the second reflector is irradiated with the second second-beam portion;
   an electromechanical-actuator configured to vary a length of an optical path between the second beam shaping lens system and the second reflector; and
   wherein the second detector is coupled to the fiber optic coupler and configured to:
      receive a first second-beam reflection of the first second-beam portion that reflects off the second side of the slab of material;
      receive a second second-beam reflection of the second second-beam portion that reflects off the second reflector;
      combine the first second-beam reflection and the second second-beam reflection into a second combined beam; and
      direct the second combined beam to the second detector to trigger an analysis of the second combined beam by the computing system.

7. The apparatus as claimed in claim 1, further comprising:
   a movable-stage configured to support the slab of material at a pre-determined level between the first low coherence sensor and the second low coherence sensor.

8. The apparatus as claimed in claim 1, wherein the first low-coherence sensor is configured to operate as a frequency-domain optical coherence tomography (FD-OCT) sensor and further comprises:
   a computer-controlled etalon filter configured to receive the first combined beam, filter the first combined beam, and direct the first combined beam over an optical fiber; and
   a computer-controlled spectrometer configured to receive the first combined beam over the optical fiber from the etalon filter and cause a spectral analysis of the first combined beam by the computing system.

9. The apparatus as claimed in claim 1, wherein the computing system is configured to analyze one or more of a spectrum and an interference pattern as a part of analyzing light received at the first detector and the second detector for determining at least one of:
   a topography of one or more surfaces of the slab of material; and
   a thickness of the slab of material.

10. An apparatus for inspecting a slab of a material, the apparatus comprising:
   a first low-coherence sensor configured to irradiate a first side of a slab of material with first light having a first polarization and configured to detect a reflected first light therefrom;
   a second low coherence sensor configured to irradiate a second side of the slab of material that is opposite the first side with second light having a second polarization and configured to detect a reflected second light therefrom;
   the first low-coherence sensor including a first polarizer configured to:
      allow light having the first polarization to pass through it;
      reject light having the second polarization;
      receive the reflected first light that has been reflected off the first side of the slab of material;
      allow the reflected first light to pass through based on the reflected first light having the first polarization;
      receive a second-light cross-talk portion of the second light that passes through the slab of material from the second side to the first side;
      reject the second-light cross-talk portion based on the second-light cross-talk portion having the second polarization; and
   a computer-controlled etalon filter configured to receive the reflected first light and filter the reflected first light;
   the second low-coherence sensor including a second polarizer configured to:
      allow light having the second polarization to pass through it;
      reject light having the first polarization;
      receive the reflected second light that has been reflected off the second side of the slab of material;
      allow the reflected second light to pass through based on the reflected second light having the second polarization;
      receive a first-light cross-talk portion of the first light that passes through the slab of material from the first side to the second side; and
      reject the first-light cross-talk portion based on the first-light cross-talk portion having the first polarization; and
   a computing system configured to:
      receive a signal from the first low-coherence sensor representing the reflected first light that passes through the first polarizer and that has been filtered by the etalon filter;
      receive a signal from the second low-coherence sensor representing the reflected second light that passes through the second polarizer; and
      analyze the reflected first light and the reflected second light.

11. The apparatus as claimed in claim 10, wherein the first polarizer is a first polarization rotator configured to polarize the first light directed towards the first side of the slab of material according to the first polarization.

12. The apparatus as claimed in claim 11, wherein the second polarizer is a second polarization rotator configured to polarize the second light directed towards the second side of the slab of material according to the second polarization.

13. The apparatus as claimed in claim 10, wherein the computing system is configured to analyze one or more of an interference pattern and a spectrum with respect to the reflected first light and the reflected second light.

14. The apparatus as claimed in claim 10, wherein the first and second polarizers correspond to one or more of linear polarizer, a half-wave plate and quarter wave plate.

15. The apparatus as claimed in claim 10, wherein the first low-coherence sensor is configured to:
    receive a first light beam, having the first polarization, from a first broadband light source;
    split the first light beam into a first first-beam portion and a second first-beam portion;
    irradiate the first-side of the slab of material with the first first-beam portion such that the first first-beam portion is used as the first light, the first first-beam portion having the first polarization;
    irradiate a first reflector with the second first-beam portion;
    receive a first first-beam reflection of the first first-beam portion that reflects off the first side of the slab of material;
    receive a second first-beam reflection of the second first-beam portion that reflects off the first reflector;
    combine the first first-beam reflection and the second first-beam reflection into a first combined beam; and
    direct the first combined beam to a detector to trigger an analysis of the first combined beam by the computing system.

16. The apparatus as claimed in claim 10, wherein the second low-coherence sensor is configured to:
    receive a second light beam, having the second polarization, from a second broadband light source;
    split the second light beam into a first second-beam portion and a second second-beam portion;
    irradiate the second-side of the slab of material with the first second-beam portion such that the first second-beam portion is used as the second light, the first second-beam portion having the second polarization caused by the second polarizer;
    irradiate a second reflector with the second second-beam portion;
    receive a first second-beam reflection of the first second-beam portion that reflects off the second side of the slab of material;
    receive a second second-beam reflection of the second first-beam portion that reflects off the second reflector;
    combine the first second-beam reflection and the second second-beam reflection into a second combined beam; and
    direct the second combined beam to a detector to trigger an analysis of the first combined beam by the computing system.

17. A method of inspecting a slab of a material, the method comprising:
    irradiating, by a first low-coherence sensor, a first side of a slab of material with a first light having a first polarization;
    irradiating, by a second low-coherence sensor, a second side of the slab of material that is opposite the first side with a second light having a second polarization;
    receiving reflected first light at a first polarizer configured to allow light having the first polarization and configured to reject light having the second polarization, the reflected first light including first light that has reflected off the first side of the slab of material;
    allowing, at the first polarizer, the reflected first light to pass through the first polarizer based on the reflected first light having the first polarization;
    receiving, at the first polarizer, a second-light cross-talk portion of the second light;
    rejecting, at the first polarizer, the second-light cross-talk portion based on the second-light cross-talk portion having the second polarization;
    receiving, at the first low-coherence sensor, the reflected first light;
    filtering, by a computer-controlled etalon filter, the reflected first light; and
    analyzing, by a computer, the reflected first light as filtered by the etalon filter.

18. The method of claim 17, further comprising:
    receiving reflected second light at a second polarizer configured to allow light having the second polarization and configured to reject light having the first polarization;
    allowing, at the second polarizer, the reflected second light to pass through the second polarizer based on the reflected second light having the second polarization;
    receiving, at the second polarizer, a first-light cross-talk portion of the first light;
    rejecting, at the second polarizer, the first-light cross-talk portion based on the first-light cross-talk portion having the first polarization;
    receiving, at the second low-coherence sensor, the second reflected light; and
    analyzing, by the computer, the reflected second light.

19. The method as claimed in claim 17, further comprising analyzing, by the computer, an interference pattern and a spectrum with respect to the reflected first light.

20. The method as claimed in claim 17, further comprising:
    receiving, at the first low-coherence sensor, a first light beam from a first broadband light source;
    splitting, at the first low-coherence sensor, the first light beam into a first first-beam portion and a second first-beam portion;
    irradiating the first-side of the slab of material with the first first-beam portion such that the first first-beam portion is used as the first light;
    irradiating, at the first low-coherence sensor, a first reflector with the second first-beam portion;
    receiving, at the first low-coherence sensor, a first first-beam reflection of the first first-beam portion that reflects off the first side of the slab of material;
    receiving, at the first low-coherence sensor, a second first-beam reflection of the second first-beam portion that reflects off the first reflector;
    combining, at the first low-coherence sensor, the first first-beam reflection and the second first-beam reflection into a first combined beam; and
    directing, at the first low-coherence sensor, the first combined beam to a detector to trigger an analysis of the first combined beam by the computer.

* * * * *